(12) United States Patent
Komatsu et al.

(10) Patent No.: US 9,845,022 B2
(45) Date of Patent: Dec. 19, 2017

(54) CONTROL DEVICE FOR ELECTRIC MOTOR VEHICLE AND CONTROL METHOD FOR ELECTRIC MOTOR VEHICLE

(71) Applicant: Nissan Motor Co., Ltd., Yokohama-Shi, Kanagawa (JP)

(72) Inventors: Hiroyuki Komatsu, Kanagawa (JP); Ken Ito, Kanagawa (JP); Takashi Nakajima, Kanagawa (JP); Yuji Katsumata, Kanagawa (JP); Akira Sawada, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/100,928

(22) PCT Filed: Nov. 20, 2014

(86) PCT No.: PCT/JP2014/080819
§ 371 (c)(1),
(2) Date: Jun. 1, 2016

(87) PCT Pub. No.: WO2015/083557
PCT Pub. Date: Jun. 11, 2015

(65) Prior Publication Data
US 2016/0297321 A1 Oct. 13, 2016

(30) Foreign Application Priority Data

Dec. 2, 2013 (JP) .................................. 2013-249098

(51) Int. Cl.
*B60L 9/00* (2006.01)
*B60L 15/20* (2006.01)
(Continued)

(52) U.S. Cl.
CPC ............. *B60L 15/2009* (2013.01); *B60L 7/14* (2013.01); *B60L 7/18* (2013.01); *B60L 11/1803* (2013.01);
(Continued)

(58) Field of Classification Search
USPC .......................................................... 701/22
See application file for complete search history.

(56) References Cited

U.S. PATENT DOCUMENTS

2001/0039230 A1* 11/2001 Severinsky ............ B60H 1/004
477/3
2002/0190683 A1 12/2002 Karikomi et al.
(Continued)

FOREIGN PATENT DOCUMENTS

JP 08-079907 A 3/1996
JP 09-130911 A 5/1997
(Continued)

*Primary Examiner* — Tyler Paige
(74) *Attorney, Agent, or Firm* — Young Basile Hanlon & MacFarlance, P.C.

(57) ABSTRACT

A control device for electric motor vehicle configured to decelerate by a regenerative braking force of the motor detects an accelerator operation amount, calculates a motor torque command value and controls the motor on the basis of the calculated motor torque command value. Further, a speed parameter proportional to a traveling speed is detected, and a feedback torque for stopping the electric motor vehicle is calculated on the basis of the detected speed parameter. Furthermore, the speed parameter is estimated in accordance with a state of the electric motor vehicle, and a feedforward torque is calculated on the basis of the estimated speed parameter. When accelerator operation amount is not larger than a predetermined value and the electric motor vehicle stops shortly, the motor torque command value is converged to zero on the basis of the feedback (Continued)

torque and the feedforward torque with a reduction in the traveling speed.

15 Claims, 20 Drawing Sheets

(51) Int. Cl.
  *B60L 7/14*  (2006.01)
  *B60L 7/18*  (2006.01)
  *B60W 30/18*  (2012.01)
  *B60L 11/18*  (2006.01)
(52) U.S. Cl.
  CPC ....... B60L 11/1861 (2013.01); B60L 15/2018 (2013.01); B60W 30/18118 (2013.01); B60W 30/18127 (2013.01); *B60L 2240/12* (2013.01); *B60L 2240/421* (2013.01); *B60L 2240/423* (2013.01); *B60L 2240/429* (2013.01); *B60L 2250/26* (2013.01); *B60L 2260/44* (2013.01); *B60L 2270/145* (2013.01); *Y02T 10/645* (2013.01); *Y02T 10/7275* (2013.01)

(56) References Cited

U.S. PATENT DOCUMENTS

| 2010/0004806 | A1* | 1/2010 | Soma | B60L 11/14 701/22 |
| 2010/0123426 | A1* | 5/2010 | Nashiki | H02K 1/12 318/701 |
| 2013/0116874 | A1 | 5/2013 | Ichinose et al. | |
| 2015/0127202 | A1 | 5/2015 | Itou | |

FOREIGN PATENT DOCUMENTS

| JP | 2002-186108 A | 6/2002 |
| JP | 2006-224703 A | 8/2006 |
| JP | 2011-259645 | 12/2011 |
| JP | 2013-223374 A | 10/2013 |

* cited by examiner (b) ONLY F/B TORQUE、Kvref SMALL (c) F/F TORQUE in conjunction, Kvref LARGE (a) UPHILL ROAD (b) FLAT ROAD (c) DOUN HILL ROAD

CONTROL DEVICE FOR ELECTRIC MOTOR VEHICLE AND CONTROL METHOD FOR ELECTRIC MOTOR VEHICLE

CROSS REFERENCE TO RELATED APPLICATION

The entire content of Japanese Patent Application No. 2013-249098, filed on Dec. 2, 2013, in which the present patent application claims priority, is herein incorporated by reference.

TECHNICAL FIELD

The present invention relates to a control device for electric motor vehicle and a control method for electric motor vehicle.

BACKGROUND

Conventionally, a regenerative brake control device for electric vehicle is known which is provided with setting means capable of arbitrarily setting a regenerative braking force of a motor and regenerates the motor by the regenerative braking force set by the setting means (see JP8-79907A).

SUMMARY

However, if the regenerative braking force set by the setting means is large, a problem of generating vibration in a front-back direction of a vehicle body arises when the electric vehicle is decelerated by the set regenerative braking force and the speed becomes zero.

The present invention aims to provide a technology for suppressing the generation of vibration in a front-back direction of a vehicle body in stopping an electric motor vehicle with a regenerative braking force.

A device for controlling an electric vehicle according to an embodiment is that a control device for electric motor vehicle using a motor as a traveling drive source and configured to decelerate by a regenerative braking force of the motor, the device for controlling an electric vehicle, which is the control device for electric motor vehicle in the one embodiment, uses the electric motor as a motor as a traveling drive source, decelerates the vehicle by the regenerative braking force of the electric motor, detects the accelerator operation amount, calculates the motor torque command value and controls the electric motor on the basis of the calculated motor torque command value. Together with this, a speed parameter proportional to the traveling speed of the electric motor vehicle is detected, and the feedback torque for stopping the electric motor vehicle is calculated on the basis of the speed parameter. Further, the speed parameter is estimated in accordance with the state of the electric motor vehicle, and the feedforward torque for compensating for the feedback torque is calculated on the basis of the speed parameter. When the accelerator operation amount is not larger than a predetermined value and the electric motor vehicle stops shortly, the motor torque command value Tm* is converged to zero on the basis of the feedback torque and the feedforward torque with a reduction in the speed parameter proportional to the traveling speed.

DETAILED DESCRIPTION OF THE EMBODIMENTS

Figure 1:
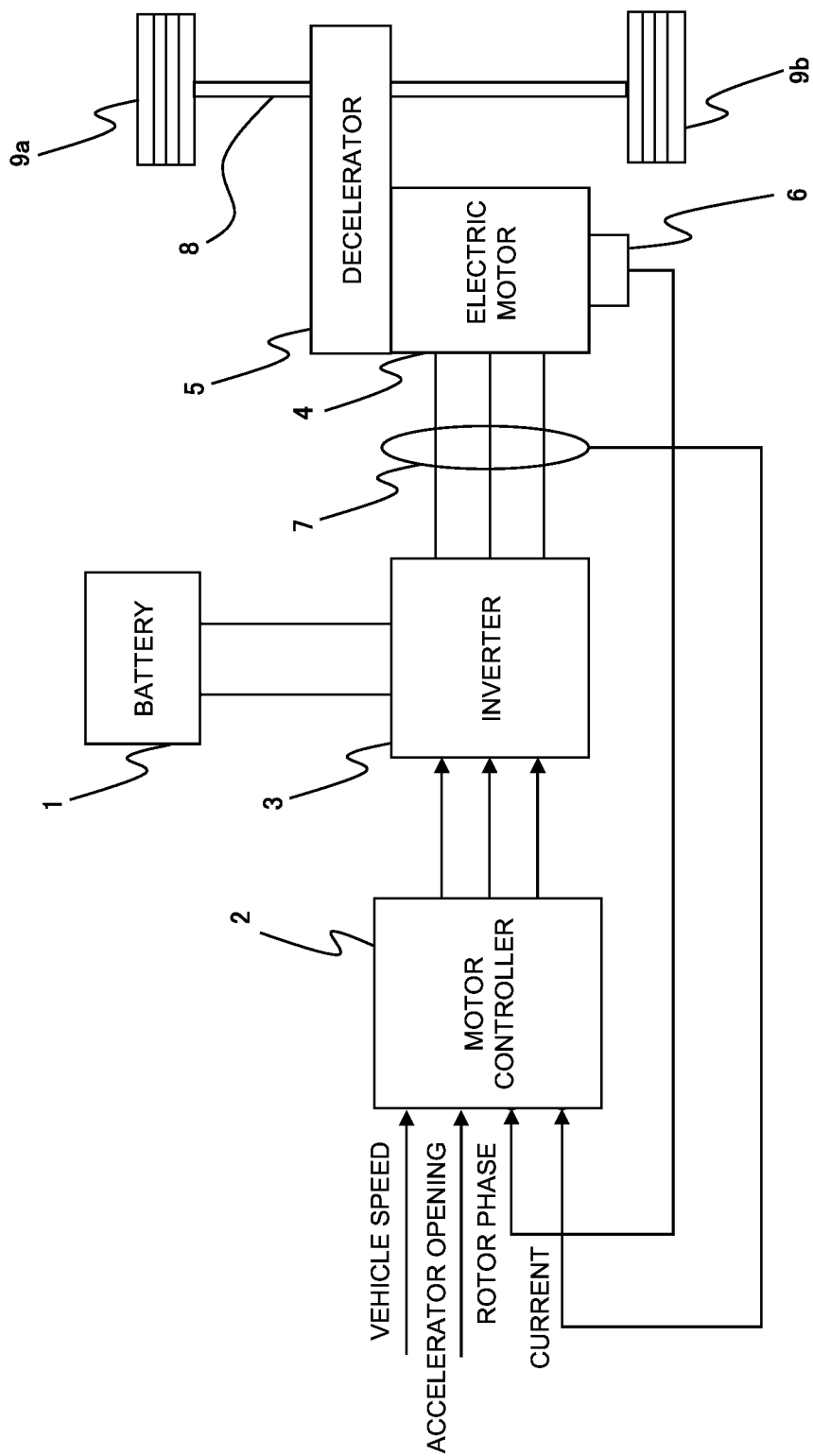
FIG. 1 is a block diagram showing a main configuration of an electric vehicle with a control device for electric motor vehicle in one embodiment.

FIG. 1 is a block diagram showing a main configuration of an electric vehicle with a control device for electric motor vehicle in one embodiment. The control device for electric motor vehicle of the present invention includes an electric motor as part or the entirety of a drive source of the vehicle and is applicable to an electric motor vehicle capable of traveling by a drive force of the electric motor. Electric motor vehicles include not only electric vehicles, but also hybrid vehicles and fuel cell vehicles. Particularly, the control device for electric motor vehicle in the present embodiment can be applied to a vehicle capable of controlling the acceleration/deceleration and the stop of the vehicle only by the operation of an accelerator pedal. In this vehicle, a driver depresses the accelerator pedal during acceleration and reduces or zeros the amount of depression of the accelerator pedal during deceleration or during stop.

A motor controller 2 has signals indicating vehicle states such as a vehicle speed (traveling speed of the electric motor vehicle) V, an accelerator pedal opening AP, a rotor phase α of an electric motor (three-phase AC motor) 4, currents iu, iv and iw of the electric motor 4 input thereto in the form of digital signals, and generates PWM signals for controlling the electric motor 4 on the basis of the input signals. Further, the motor controller 2 generates a drive signal for an inverter 3 in accordance with the generated PWM signals.

The inverter 3 includes, for example, two switching elements (e.g. power semiconductor elements such as IGBTs or MOS-FETs) for each phase, converts a direct current supplied from a battery 1 into an alternating current by turning on and off the switching elements in accordance with the drive signal and causes a desired current to flow into the electric motor 4.

The electric motor 4 generates a drive force by the alternating current supplied from the inverter 3 and transmits the drive force to left and right drive wheels 9a, 9b via a speed reducer 5 and a drive shaft 8. Further, when being rotated following the rotation of the drive wheels 9a, 9b during the travel of the vehicle, the electric motor 4 generates a regenerative drive force, thereby collecting kinetic energy of the vehicle as electrical energy. In this case, the inverter 3 converts an alternating current generated during the regenerative operation of the electric motor 4 into a direct current and supplies it to the battery 1.

A current sensor 7 detects three-phase alternating currents iu, iv and iw flowing in the electric motor 4. However, since the sum of the three-phase alternating currents is 0, the currents of arbitrary two phases may be detected and the current of the remaining one phase may be obtained by calculation.

A rotation sensor 6 is, for example, a resolver or an encoder and detects the rotor phase α of the electric motor 4.

Figure 2:
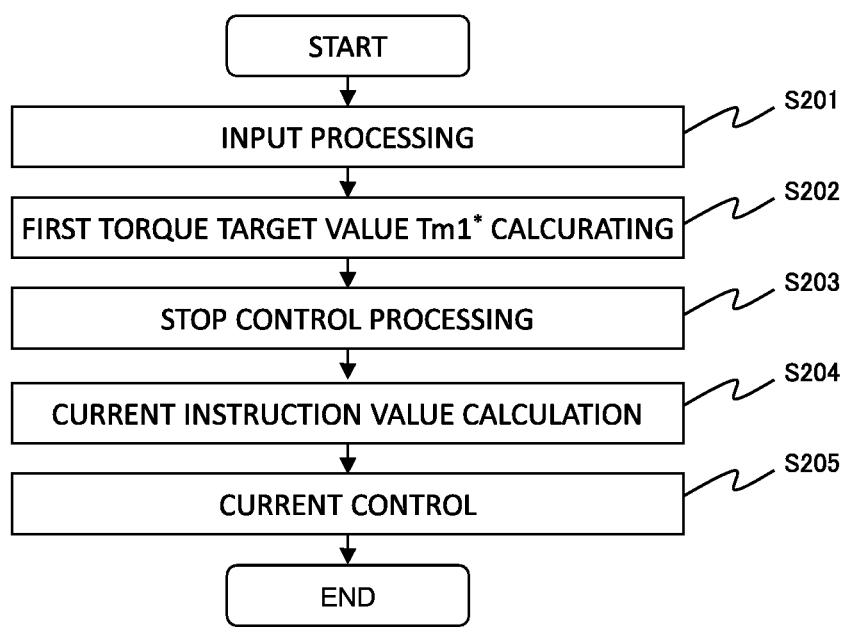
FIG. 2 is a flow chart showing the flow of a motor current control process performed by a motor controller.

FIG. 2 is a flow chart showing the flow of a motor current control process performed by the motor controller 2.

In Step S201, signals indicating the vehicle states are input. Here, the vehicle speed V (km/h), the accelerator pedal opening AP (%), the rotor phase α (rad) of the electric motor 4, a rotation speed Nm (rpm) of the electric motor 4, the three-phase alternating currents iu, iv and iw flowing in the electric motor 4 and a direct-current voltage value Vdc (V) between the battery 1 and the inverter 3 are input.

The vehicle speed V (km/h) is obtained by an unillustrated vehicle speed sensor or through communication by another controller. Alternatively, a vehicle speed v (m/s) is obtained by multiplying a rotor mechanical angular velocity ωm by a tire dynamic radius R and dividing the product by a gear ratio of a final gear, and then multiplied by 3600/1000 for unit conversion, thereby obtaining the vehicle speed V (km/h).

The accelerator pedal opening AP (%) is obtained from an unillustrated accelerator pedal opening sensor or through communication from another controller such as an unillustrated vehicle controller.

The rotor phase α (rad) of the electric motor 4 is obtained from the rotation sensor 6. The rotation speed Nm (rpm) of the electric motor 4 is obtained by dividing a rotor angular velocity ω (electric angle) by a pole pair number P of the electric motor 4 to obtain the motor rotation speed ωm (rad/s), which is a mechanical angular velocity of the electric motor 4, and multiplying the obtained motor rotation speed ωm by 60/(2π). The rotor angular velocity ω is obtained by differentiating the rotor phase α.

The currents iu, iv and iw (A) flowing in the electric motor 4 are obtained from the current sensor 7.

The direct-current voltage value Vdc (V) is obtained from a voltage sensor (not shown) provided in a direct-current power supply line between the battery 1 and the inverter 3 or a power supply voltage value transmitted from a battery controller (not shown).

Figure 3:
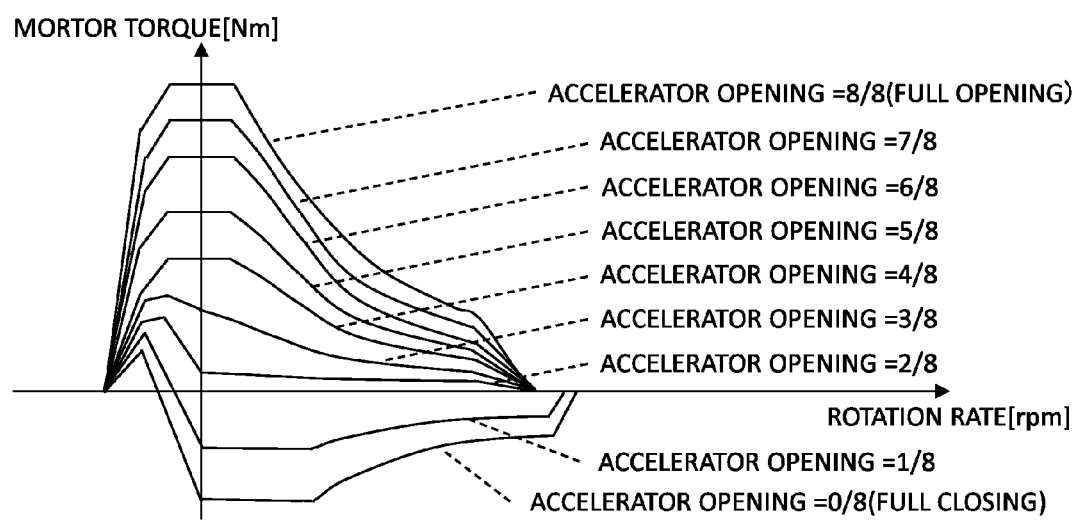
FIG. 3 is a graph showing an example of an accelerator pedal opening-torque table.

In Step S202, a first torque target value Tm1* is set. Specifically, the first torque target value Tm1* is set on the basis of the accelerator pedal opening AP and the motor rotation speed ωm input in Step S201 by referring to an accelerator pedal opening-torque table shown in FIG. 3. As described above, the control device for electric motor vehicle in the present embodiment is applicable to a vehicle capable of controlling the acceleration/deceleration and the stop of the vehicle only by the operation of the accelerator pedal. To enable the vehicle to stop at least by fully closing the accelerator pedal, a motor torque is set to increase a motor regeneration amount when the accelerator pedal opening is 0 (fully closed) in the accelerator pedal opening-torque table shown in FIG. 3. Specifically, when the motor rotation speed is positive and at least the accelerator pedal opening is 0 (fully closed), a negative motor torque is set so that a regenerative braking force works. However, the accelerator pedal opening-torque table is not limited to the one shown in FIG. 3.

In Step S203, a stop control process is performed to execute such a control that the electric motor vehicle stops. Specifically, a moment just before the electric motor vehicle stops is judged, the first torque target value Tm1* calculated in Step S202 is set as a motor torque command value Tm* before the moment just before the stop, and a second torque target value Tm2* which converges to a value balanced with a disturbance torque with a reduction in the motor rotation speed is set as the motor torque command value Tm* after the moment just before the stop. This second torque target value Tm2* is a positive torque on an uphill road, a negative torque on a downhill road and substantially zero on a flat road. In this way, a vehicle stopped state can be maintained regardless of a gradient of a road surface as described later. The detail of the stop control process is described later.

In Step S204, a d-axis current target value id* and a q-axis current target value iq* are obtained on the basis of the motor torque target value Tm* calculated in Step S203, the motor rotation speed ωm and the direct-current voltage value Vdc. For example, a table defining a relationship of the d-axis current target value and the q-axis current target value with the torque command value, the motor rotation speed and the direct-current voltage value is prepared in advance and the d-axis current target value id* and the q-axis current target value iq* are obtained by referring to this table.

In Step S205, a current control is executed to match a d-axis current id and a q-axis current iq with the d-axis current target value id* and the q-axis current target value iq* obtained in Step S204. To this end, the d-axis current id and the q-axis current iq are first obtained on the basis of the three-phase alternating current values iu, iv and iw and the rotor phase α of the electric motor 4 input in Step S201. Subsequently, d-axis and q-axis voltage command values vd, vq are calculated from deviations between the d-axis and q-axis current command values id*, iq* and the d-axis and q-axis currents id, iq. It should be noted that a non-interference voltage necessary to cancel out an interference voltage between d-q orthogonal coordinate axes may be added to the calculated d-axis and q-axis voltage command values vd, vq.

Subsequently, three-phase alternating-current voltage command values uv, vv and vw are obtained from the d-axis and q-axis voltage command values vd, vq and the rotor phase α of the electric motor 4. Then, PWM signals tu (%), tv (%) and tw (%) are obtained from the obtained three-phase alternating-current voltage command values vu, vv and vw and the direct-current voltage value Vdc. By opening and closing the switching elements of the inverter 3 by the PWM signals tu, tv and tw obtained in this way, the electric motor 4 can be driven with a desired torque instructed by the torque command value Tm*.

Here, before describing the stop control process performed in Step S203, a transmission characteristic Gp(s) from the motor torque Tm to the motor rotation speed ωm is described in the control device for electric motor vehicle in the present embodiment.

Figure 4:
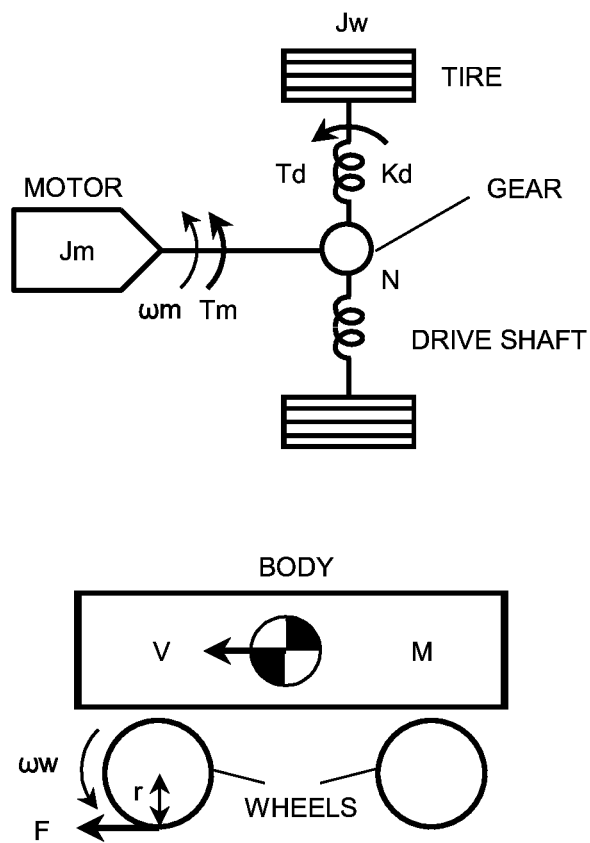
FIG. 4 is a diagram modeling a drive force transmission system of the vehicle.

FIG. 4 is a diagram modeling a drive force transmission system of the vehicle and each parameter in FIG. 4 is as below.

$J_m$: inertia of electric motor
$J_w$: inertia of drive wheels
M: weight of vehicle
$K_d$: torsional rigidity of drive system
$K_t$: coefficient on friction between tires and road surface
N: overall gear ratio
r: load radius of tires
$\omega_m$: angular velocity of electric motor
$T_m$: torque target value
$T_d$: torque of drive wheels
F: force applied to vehicle
V: speed of vehicle
$\omega_w$: angular velocity of drive wheels The following motion equations can be derived from FIG. 4. However, asterisk (*) attached to the right-upper corner of a symbol in equations (1) to (3) indicates a time differential.

[Equation 1]

$$J_m \cdot \omega_m^* = T_m - T_d/N \quad (1)$$

[Equation 2]

$$2J_w \cdot \omega_w^* = T_d - rF \quad (2)$$

[Equation 3]

$$M \cdot V^* = F \quad (3)$$

[Equation 4]

$$T_d = K_d \cdot \int (\omega_m/N - \omega_w) dt \quad (4)$$

[Equation 5]

$$F = K_t \cdot (r\omega_w - V) \quad (5)$$

The transmission characteristic Gp(s) from the torque target value Tm to the motor rotation speed ωm of the electric motor 4 obtained on the basis of the motion equations (1) to (5) is expressed by the following equation (6).

[Equation 6]

$$G_p(s) = \frac{b_3 s^3 + b_2 s^2 + b_1 s + b_0}{s(a_4 s^3 + a_3 s^2 + a_2 s + a_1)} \quad (6)$$

Here, each parameter in equation (6) is expressed by the following equations (7).

[Equations 7]

$$a_4 = 2 J_m J_w M$$

$$a_3 = J_m(2J_w + Mr^2)K_t$$

$$a_2 = (J_m + 2J_w/N^2) M \cdot K_d$$

$$a_1 = (J_m + 2J_w/N^2 + Mr^2/N^2) K_d \cdot K_t$$

$$b_3 = 2 J_w \cdot M$$

$$b_2 = (2J_w + Mr^2) K_t$$

$$b_1 = M \cdot K_d$$

$$b_0 = K_d \cdot K_t \quad (7)$$

The poles and zero point of the transmission function shown in equation (6) can be approximated to a transmission function of the following equation (8) and one pole and one zero point indicate values extremely close to each other. This is equivalent to that α and β of the following equation (8) indicate values extremely close to each other.

[Equation 8]

$$G_p(s) = \frac{(s + \beta)(b_2' s^2 + b_1' s + b_0')}{s(s + \alpha)(a_3' s^2 + a_2' s + a_1')} \quad (8)$$

Accordingly, by performing pole-zero cancellation (approximation to α=β) in equation (8), the transmission characteristic Gp(s) constitutes a transmission characteristic of (second order)/(third order) as shown in the following equation (9).

[Equation 9]

$$G_p(s) = \frac{(b_2' s^2 + b_1' s + b_0')}{s(a_3' s^2 + a_2' s + a_1')} \cdot \frac{\beta}{\alpha} \quad (9)$$

In this way, the transmission characteristic Gp(s) is derived on the basis of a vehicle model shown in FIG. 4. By simplifying the vehicle model of the transmission characteristic Gp(s), a simplified vehicle model Gp'(s) is expressed by the following equation (10).

[Equation 10]

$$G_p'(s) = \frac{b_0'}{a_1' s} \cdot \frac{\beta}{\alpha} \quad (10)$$

It should be noted that although an example where $a_1'$ and $b_0'$ in equation (9) are used as coefficients of the simplified vehicle model Gp'(s) in the present embodiment, $a_1$ and $b_0$ in equation (6) may be used instead of $a_1'$ and $b_0'$.

Figure 5:
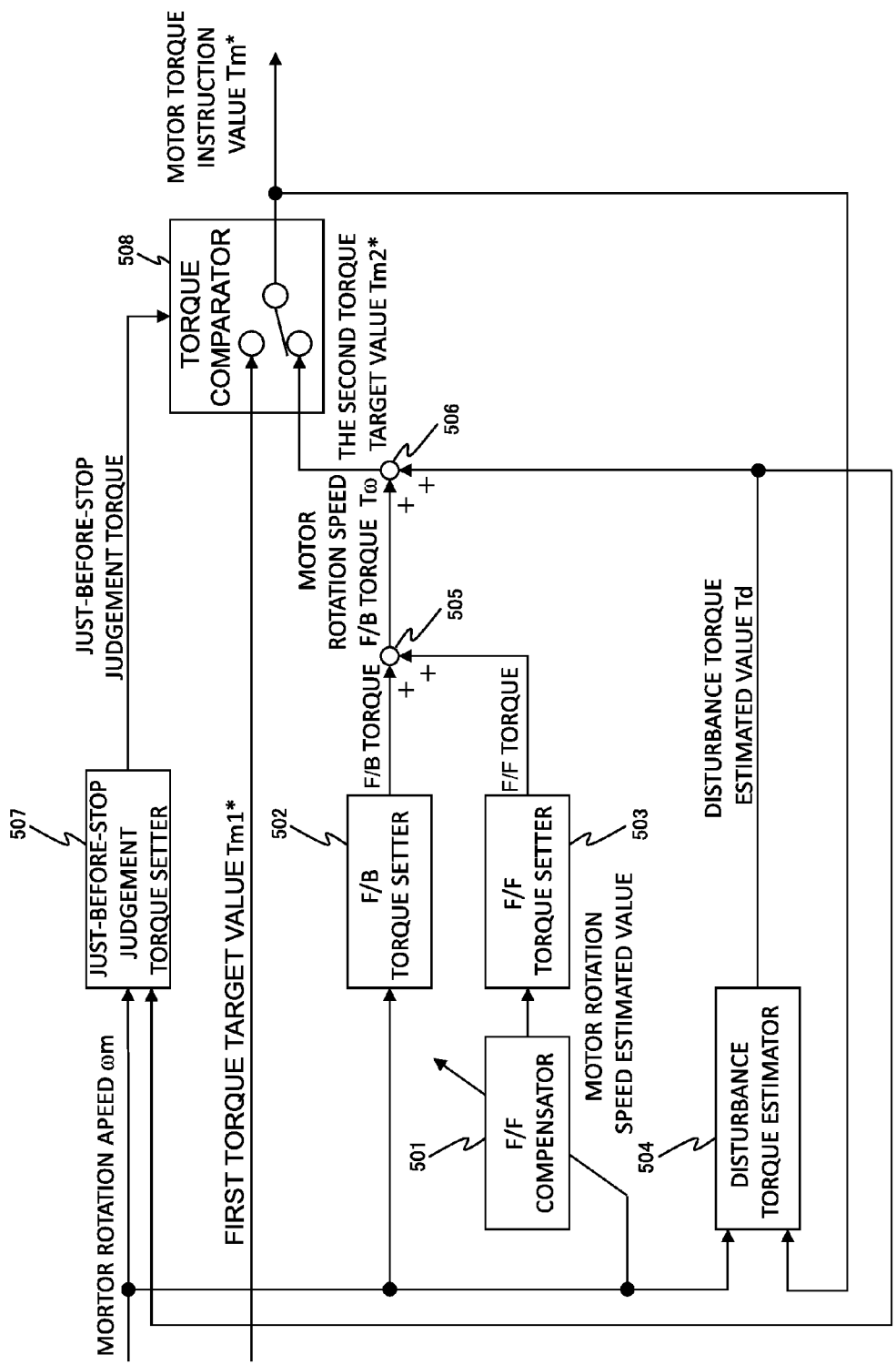
FIG. 5 is a block diagram for realizing a stop control process.

Next, the detail of the stop control process performed in Step S203 of FIG. 2 is described. FIG. 5 is a block diagram for realizing the stop control process. FIG. 5 shows an F/F compensator 501, an F/B torque setter 502, an F/F torque setter 503, a disturbance torque estimator 504, an adder 505, an adder 506, a just-before-stop judgment torque setter 507 and a torque comparator 508. Feedback is written as "F/B" and feedforward is written as "F/F" below.

The F/F compensator 501 estimates the rotation speed of the electric motor 4 by an open loop. An estimated value of the rotation speed of the electric motor 4 is referred to as a "motor rotation speed estimated value" below.

Figure 6:
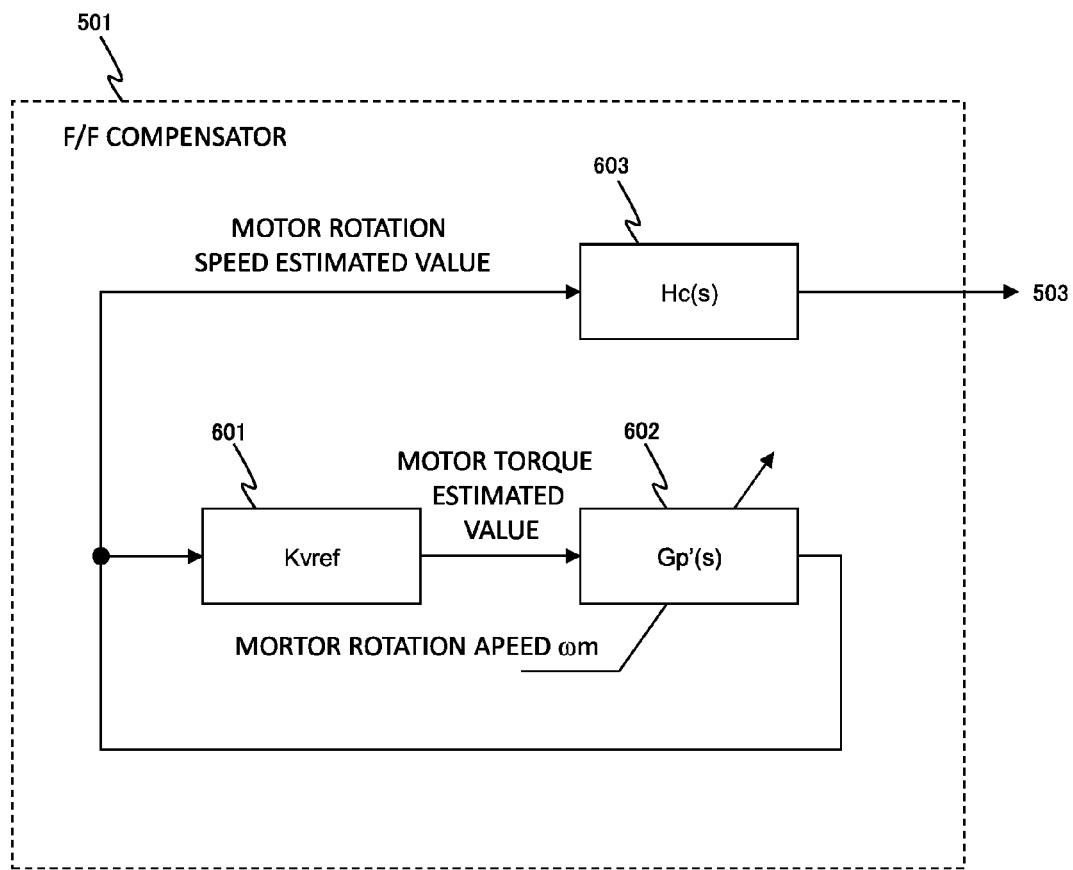
FIG. 6 is a diagram showing a method for calculating a motor rotation speed estimated value.

FIG. 6 is a diagram showing a method for calculating the motor rotation speed estimated value in accordance with a state of the electric motor vehicle. The F/F compensator 501 includes a motor torque estimation unit 601, a motor rotation speed estimation unit 602 and a low-pass filter 603.

The motor torque estimation unit 601 calculates a motor torque estimated value by multiplying the motor rotation speed estimated value by a predetermined gain (hereinafter, referred to as a "total gain") Kvref.

The total gain Kvref is a negative (minus) value predetermined for smoothly stopping the electric motor vehicle while suppressing an extension of a braking distance and appropriately set, for example, by experimental data. The motor torque estimation unit 601 outputs the motor torque estimated value to the motor rotation speed estimation unit 602.

The motor rotation speed estimation unit 602 converts the motor torque estimated value into the motor rotation speed estimated value on the basis of the vehicle model Gp(s) shown in equation (6). In the present embodiment, the simplified vehicle model Gp'(s) shown in equation (10) is used instead of the vehicle model Gp(s).

The motor rotation speed estimation unit 602 calculates the motor rotation speed estimated value based on the simplified vehicle model Gp'(s) by inputting the motor torque estimated value to the simplified vehicle model Gp'(s). The motor rotation speed estimation unit 602 outputs the motor rotation speed estimated value based on the simplified vehicle model Gp'(s) to the motor torque estimation unit 601 and the low-pass filter 603.

The low-pass filter 603 is a filter having a transmission characteristic Hc(s) set to complement the simplified vehicle model Gp'(s). The transmission characteristic Hc(s) is set on the basis of simulation, experimental data or the like. Specifically, a time constant of the transmission characteristic Hc(s) is adjusted so that the convergence of the motor rotation speed ωm and the convergence of the motor rotation speed estimated value to be input to the F/F torque setter 503 are equal in a state where the total gain Kvref is smaller than zero.

Thus, the motor rotation speed estimated value to be input to the F/F torque setter 503 is subjected to a low-pass filtering by the low-pass filter 603. Therefore, a deviation of a response characteristic associated with the use of the simplified vehicle model Gp'(s) is corrected.

As just described, in the F/F compensator 501, the motor rotation speed estimated value is calculated on the basis of the vehicle model Gp(s) and the motor torque estimated value converges to zero with a reduction in the calculated motor rotation speed estimated value. Thus, the motor rotation speed estimated value can be obtained by the F/F compensator 501 just before the electric motor vehicle stops.

It should be noted that the motor rotation speed estimation unit 602 initializes the simplified vehicle model Gp'(s) on the basis of the motor rotation speed ωm if it is judged by the torque comparator 508 to be described later that a moment just before the electric motor vehicle stops has not been reached yet. For example, the simplified vehicle model Gp'(s) is composed of constants a1' and b0' uniquely determined by design values of the vehicle and an integrator. If it is judged that the electric motor vehicle stops shortly, the simplified vehicle model Gp'(s) is initialized by setting an initial value of the above integrator as the motor rotation speed ωm.

Next, the configuration of the F/B torque setter 502 shown in FIG. 5 is described.

The F/B torque setter 502 calculates an feedback torque (hereinafter, referred to as an F/B torque) for stopping the electric motor vehicle by the regenerative braking force of the electric motor 4 on the basis of the detected motor rotation speed ωm.

Figure 7:
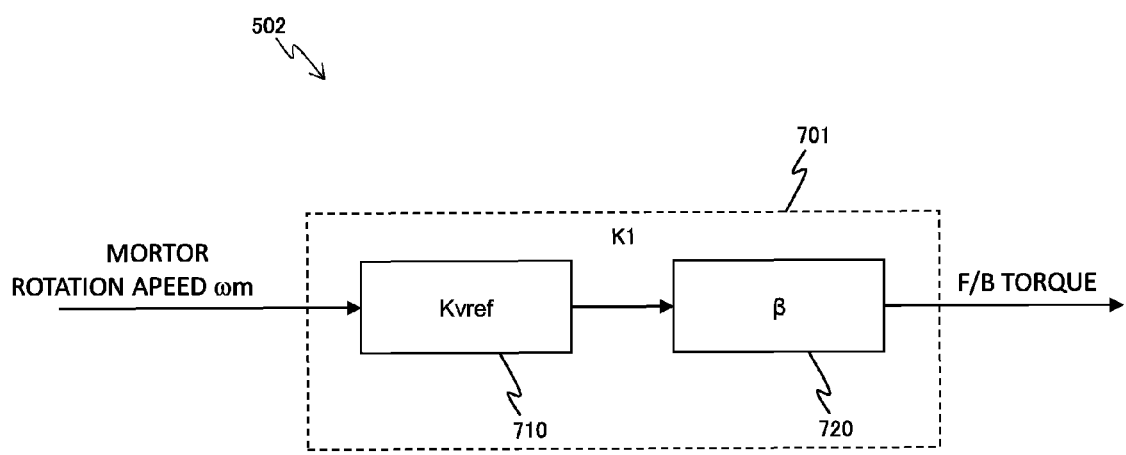
FIG. 7 is a diagram showing a method for calculating an F/B torque on the basis of a detected motor rotation speed.

FIG. 7 is a diagram showing a method for calculating the F/B torque on the basis of the motor rotation speed ωm.

The F/B torque setter 502 includes a multiplier 701 for converting the motor rotation speed ωm into the F/B torque.

The multiplier 701 calculates the F/B torque by multiplying the motor rotation speed ωm by an F/B gain K1 determined to distribute the regenerative braking force of the electric motor 4. The F/B gain K1 is set in a direction to weaken the regenerative braking force as against the total gain Kvref. Specifically, the F/B gain K1 is set at a value smaller than zero and larger than the total gain Kvref. The multiplier 701 includes a total gain multiplier 710 and a distribution coefficient multiplier 720.

The total gain multiplier 710 calculates an F/B total torque by multiplying the motor rotation speed ωm by the total gain Kvref.

The distribution coefficient multiplier 720 calculates the F/B torque by multiplying the F/B total toque by a distribution coefficient β. However, the distribution coefficient β is a value larger than "0" and smaller than "1". The distribution coefficient β is set on the basis of simulation or experimental data or the like.

As just described, in the multiplier 701, the F/B torque can be reduced to reduce the regenerative braking force by using the value obtained by multiplying the total gain Kvref by the distribution coefficient β as the F/B gain K1. Further, since the F/B torque is calculated by multiplying the motor rotation speed ωm by the F/B gain K1, the F/B torque is set as a torque to give a larger regenerative braking force with an increase in the motor rotation speed ωm.

It should be noted that although the F/B torque setter 502 is described to calculate the F/B torque by multiplying the motor rotation speed ωm by the F/B gain K1, the F/B torque may be calculated using a regenerative torque table defining a regenerative torque in relation to the motor rotation speed ωm, an attenuation rate table storing an attenuation rate of the motor rotation speed ωm in advance or the like.

Next, the configuration of the F/F torque setter 503 shown in FIG. 5 is described.

The F/F torque setter 503 calculates a feedforward torque (hereinafter, referred to as an F/F torque) on the basis of the motor rotation speed estimated value output from the F/F compensator 501. A shortage of the regenerative braking force caused by the F/B torque is compensated for by the F/F torque just before the vehicle stops.

Figure 8:
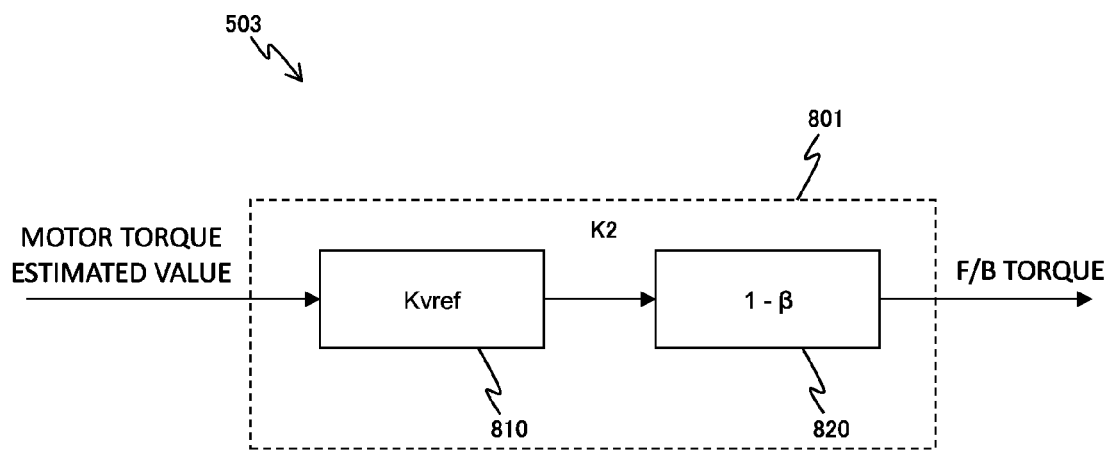
FIG. 8 is a diagram showing a method for calculating an F/F torque on the basis of the motor rotation speed estimated value.

FIG. 8 is a diagram showing a method for calculating the F/F torque on the basis of the motor rotation speed ωm.

The F/F torque setter 503 includes a multiplier 801 for converting the motor rotation speed estimated value into the F/F torque.

The multiplier 801 calculates the F/F torque by multiplying the motor rotation speed ωm by an F/F gain K2 set in accordance with the F/B gain K1. The multiplier 801 includes a total gain multiplier 810 and a distribution coefficient multiplier 820.

The total gain multiplier 810 calculates an F/F total torque by multiplying the motor rotation speed estimated value by the total gain Kvref.

The distribution coefficient multiplier 820 calculates the F/F torque by multiplying the F/F total torque by a distribution coefficient (1-β). However, since the distribution coefficient β is a value larger than "0" and smaller than "1" as described with reference to FIG. 7, the distribution coefficient (1-β) is a value larger than "0" and smaller than "1".

As just described, in the multiplier 801, a reduction of the F/B torque in the F/B torque setter 502 can be allotted to the F/F torque by using a value obtained by multiplying the total gain Kvref by the distribution coefficient (1-β) as the F/F gain K2. Further, since the F/F torque is calculated by multiplying the motor rotation speed ωm by the F/F gain K2, the F/F torque is set as a torque to give a larger regenerative braking force with an increase in the motor rotation speed ωm.

It should be noted that although the F/F torque setter 503 is described to calculate the F/F torque by multiplying the motor rotation speed estimated value by the F/F gain K2, the F/F torque may be calculated using a regenerative torque table defining a regenerative torque in relation to the motor rotation speed ωm, an attenuation rate table storing an attenuation rate of the motor rotation speed estimated value in advance or the like.

Next, the configuration of the disturbance torque estimator 504 shown in FIG. 5 is described.

The disturbance torque estimator 504 calculates a disturbance torque estimated value Td on the basis of the detected motor rotation speed ωm and the motor torque command value Tm*.

Figure 9:
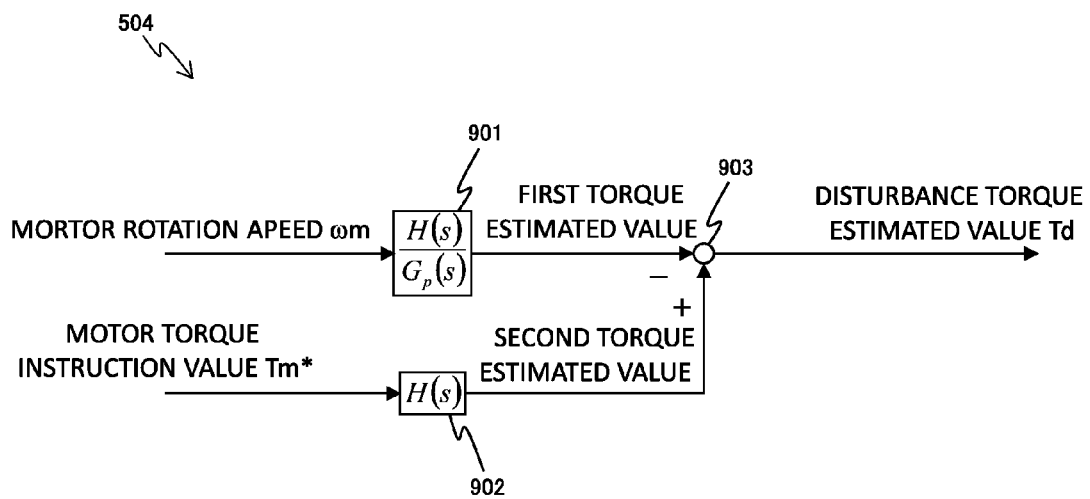
FIG. 9 is a block diagram showing a method for calculating a disturbance torque estimated value on the basis of the motor rotation speed and a motor torque command value.

FIG. 9 is a block diagram showing a method for calculating the disturbance torque estimated value Td on the basis of the motor rotation speed ωm and the motor torque command value Tm*.

A control block 901 functions as a filter having a transmission characteristic H(s)/Gp(s) and calculates a first motor torque estimated value by filtering the input motor rotation speed ωm. Gp(s) is the vehicle model of the transmission characteristic of the torque input to the vehicle and the motor rotation speed, and H(s) is a low-pass filter having such a transmission characteristic that a difference between the denominator degree and the numerator degree thereof is not smaller than a difference between the denominator degree and the numerator degree of the model Gp(s).

A control block 902 functions as a low-pass filter having the transmission characteristic H(s) and calculates a second motor torque estimated value by filtering the input motor torque command value Tm*.

A subtractor 903 calculates the disturbance torque estimated value by subtracting the first motor torque estimated value from the second motor torque estimated value.

It should be noted that although the disturbance torque is estimated by an disturbance observer as shown in FIG. 9 in the present embodiment, it may be estimated using a meter such as a vehicle longitudinal G sensor.

Here, air resistance, a modeling error caused by a variation of a vehicle mass due to the number of passengers and load capacity, rolling resistance of the tires, gradient resistance of the road surface and the like can be thought as disturbances, but a disturbance factor dominant just before the vehicle stops is gradient resistance. Disturbance factors differ depending on driving conditions, but the disturbance factors described above can be collectively estimated since the disturbance torque estimator 504 calculates the disturbance torque estimated value Td on the basis of the motor torque command value Tm*, the motor rotation speed ωm and the vehicle model Gp(s). This enables the realization of a smooth vehicle stop from deceleration under any driving condition.

Referring back to FIG. 5, configurations other than the F/F compensator 501, the F/B torque setter 502, the F/F torque setter 503 and the disturbance torque estimator 504 shall be described in continuation.

The adder 505 calculates a motor rotation speed F/B torque Tw by adding the F/B torque calculated by the F/B torque setter 502 and the F/F torque calculated by the F/F torque setter 503.

The adder 506 calculates the second torque target value Tm2* by adding the motor rotation speed F/B torque Tw calculated by the adder 505 and the disturbance torque estimated value Td calculated by the disturbance torque estimator 504.

The just-before-stop judgment torque setter 507 calculates a just-before-stop judgment torque on the basis of the detected motor rotation speed ωm and the disturbance torque estimated value.

Figure 10:
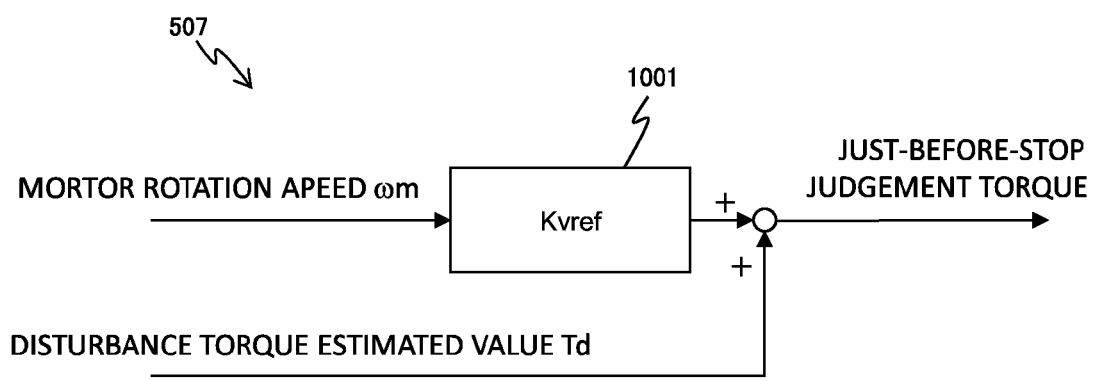
FIG. 10 is a block diagram showing a method for calculating a just-before-stop judgment torque on the basis of the motor rotation speed and the disturbance torque estimated value.

FIG. 10 is a block diagram showing a method for calculating the just-before-stop judgment torque on the basis of the motor rotation speed ωm and the disturbance torque estimated value. The just-before-stop judgment torque setter 507 includes a multiplier 1001 and calculates the just-before-stop judgment torque by adding the disturbance torque to the value obtained by multiplying the motor rotation speed ωm by the total gain Kvref.

Referring back to FIG. 5, the configuration of the torque comparator 508 is described.

The torque comparator 508 compares the magnitude of the first torque target value Tm1* calculated in Step S202 and that of the just-before-stop judgment torque calculated by the just-before-stop judgment torque setter 507.

The just-before-stop judgment torque is smaller than the first torque target value Tm1* during the travel of the vehicle and becomes larger than the first torque target value Tm1* when the vehicle decelerates and stops shortly (vehicle speed is not higher than a predetermined vehicle speed). The torque comparator 508 judges that the vehicle stops shortly and switches the motor torque command value Tm* from the first torque target value Tm1* to the second torque target value Tm2* when the just-before-stop judgment torque becomes larger than the first torque target value Tm1*.

As just described, the torque comparator 508 sets the first torque target value Tm1* as the motor torque command value Tm* by determining that a moment just before the vehicle stops has not been reached yet if the just-before-stop judgment torque is judged to be equal to or smaller than the firsts torque target value Tm1*. On the other hand, the torque comparator 508 judges that the vehicle stops shortly and switches the motor torque command value Tm* from the first torque target value Tm1* to the second torque target value Tm2* if the just-before-stop judgment torque is judged to be larger than the first torque target value Tm1*.

It should be noted that the second torque target value Tm2* is a positive torque on an uphill road, a negative torque on a downhill road and substantially zero on a flat road to maintain the vehicle stopped state.

Figure 11A:
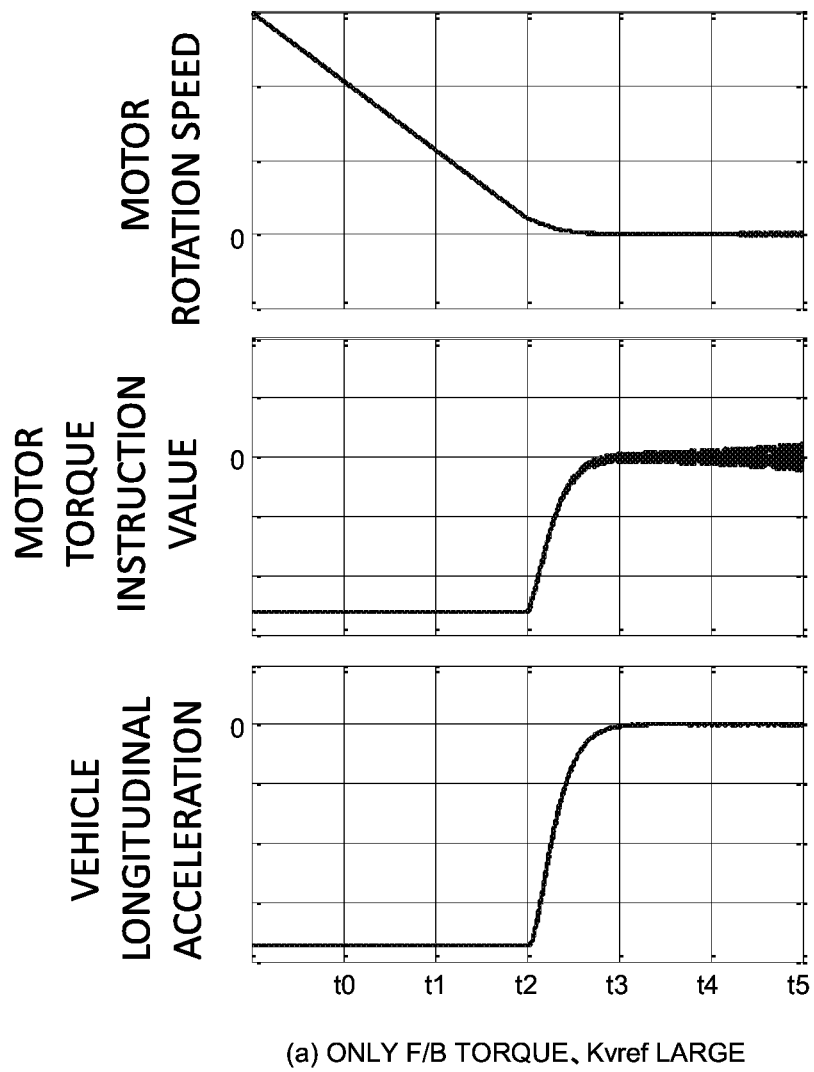
FIG. 11A is a time chart when the stop control process is performed using only the F/B torque without using the F/F torque in conjunction.
Figure 11B:
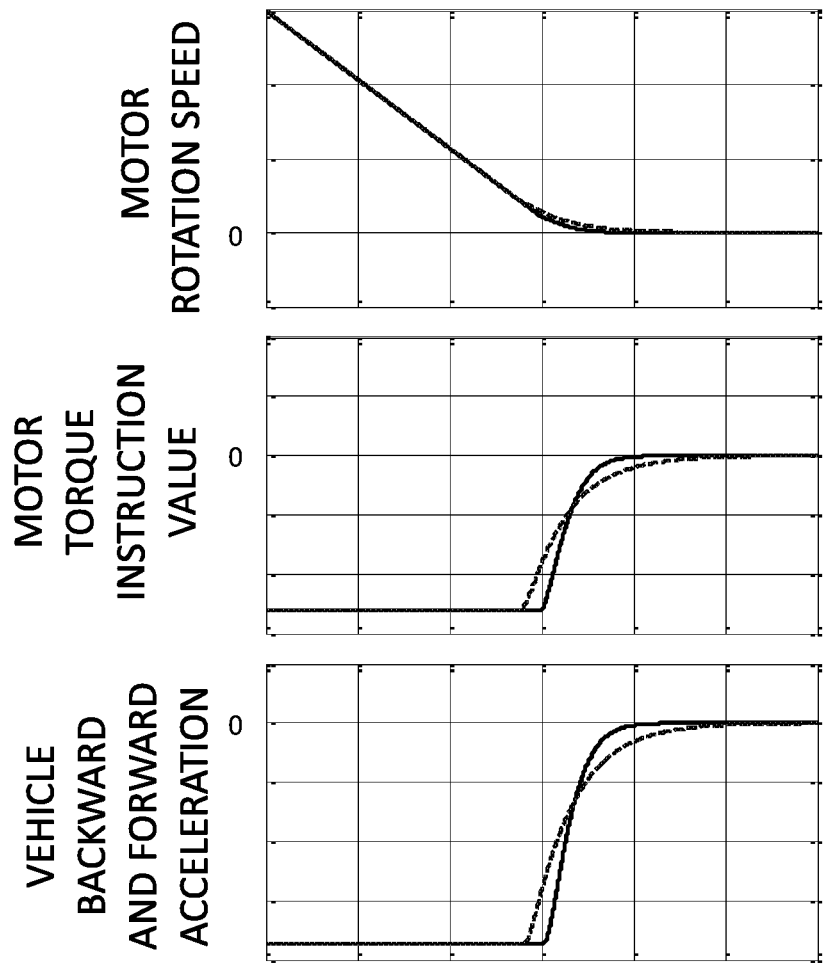
FIG. 11B is a time chart when a total gain Kvref is set smaller than in FIG. 11A without using the F/F torque in conjunction.
Figure 11C:
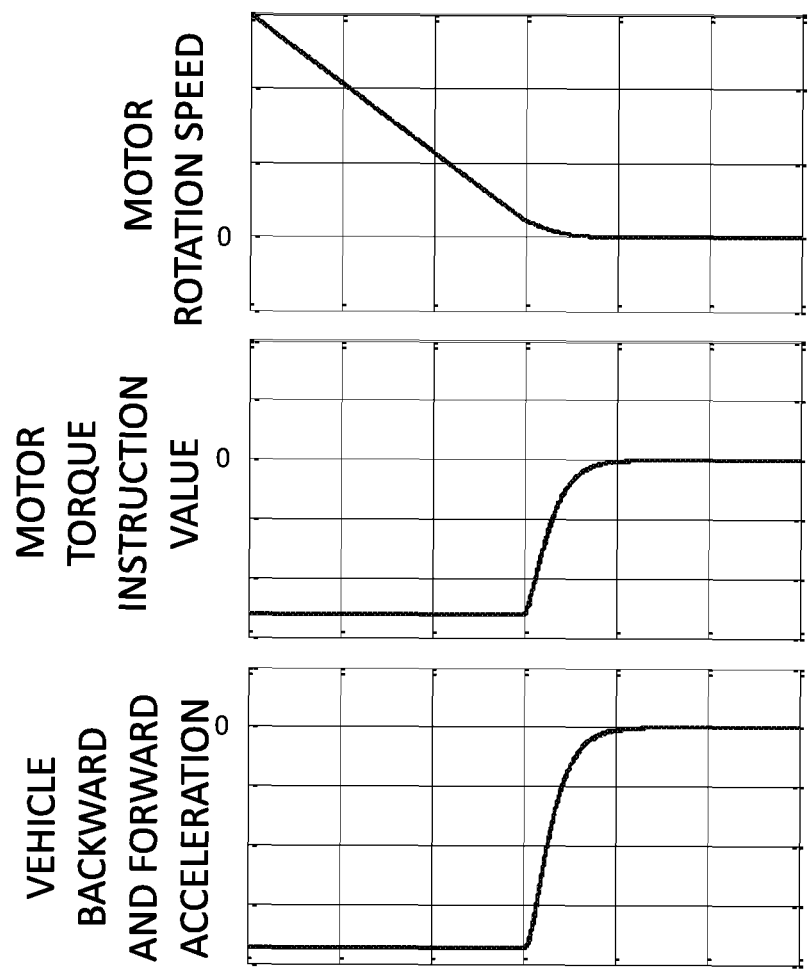
FIG. 11C is a time chart when the F/F torque is used in conjunction by the control device for electric motor vehicle in the one embodiment.

FIGS. 11A to 11C are charts showing an effect of using the F/F torque in conjunction with the F/B torque. In FIGS. 11A to 11C, ideal responses not considering loss time such as control operation delays, sensor detection delays and actuator response delays are shown by solid lines and actual responses considering loss time are shown by broken lines.

FIG. 11A is a time chart when the stop control process is performed using only the F/B torque without using the F/F torque in conjunction. In FIG. 11A, β=1 and the total gain Kvref is set at a large value to shorten a braking distance.

In FIG. 11A, the motor rotation speed, the motor torque command value and the vehicle longitudinal acceleration are shown successively from top.

From time t0 to time t1, the electric motor 4 is decelerated on the basis of the first torque target value Tm1* calculated in Step S202 of FIG. 2.

At time t2, the just-before-stop judgment torque calculated by the just-before-stop judgment torque setter 507 of FIG. 5 becomes larger than the first torque target value Tm1* and it is judged that the vehicle stops shortly, whereby the motor torque command value Tm* is switched from the first torque target value Tm1* to the second torque target value tm2*. Thereafter, the motor torque command value Tm* approaches zero little by little as the motor rotation speed ωm decreases.

At time t3, as a result of setting the total gain Kvref at a large value to shorten the braking distance, the second torque target value Tm2* set as the motor torque command value Tm* vibrates without converging.

As just described, since the motor torque command value Tm* vibrates if it is attempted to shorten the braking distance using only the F/B torque shortly before the vehicle stops, the stability of a control system cannot be ensured and the control system is in an unstable state.

FIG. 11B is a time chart when the total gain Kvref is set smaller than in FIG. 11A without using the F/F torque in conjunction. In FIG. 11B, β=1 as in FIG. 11A.

Actual responses shown by broken lines in FIG. 11B differ from those in FIG. 11A after time t2, the motor torque command value Tm* does not vibrate and the stability of the control system is ensured. However, as a result of setting the total gain Kvref small, the F/B torque becomes insufficient and a torque response becomes slack. Thus, the actual responses provide a longer traveling time just before the vehicle stops and extend the braking distance as compared to ideal responses shown by solid lines.

As just described, if the total gain Kvref is made smaller to ensure the stability of the control system using only the F/B torque just before the vehicle stop, the stability of the control system can be ensured, but the braking distance is extended.

FIG. 11C is a time chart when the F/F torque is used in conjunction by the control device for electric motor vehicle in the present embodiment.

As shown in FIG. 11C, the motor torque command value Tm* does not vibrate, the torque response of the electric motor 4 is not slack and actual responses and ideal responses match well.

As just described, by using the F/F torque in conjunction with the F/B torque, the F/B torque can be reduced and a shortage of the F/B torque can be compensated for by the F/F torque. Thus, it is possible to ensure the stability of the control system while suppressing an increase of the braking distance. Therefore, a smooth vehicle stop from the deceleration of the vehicle can be realized.

Figure 12A:
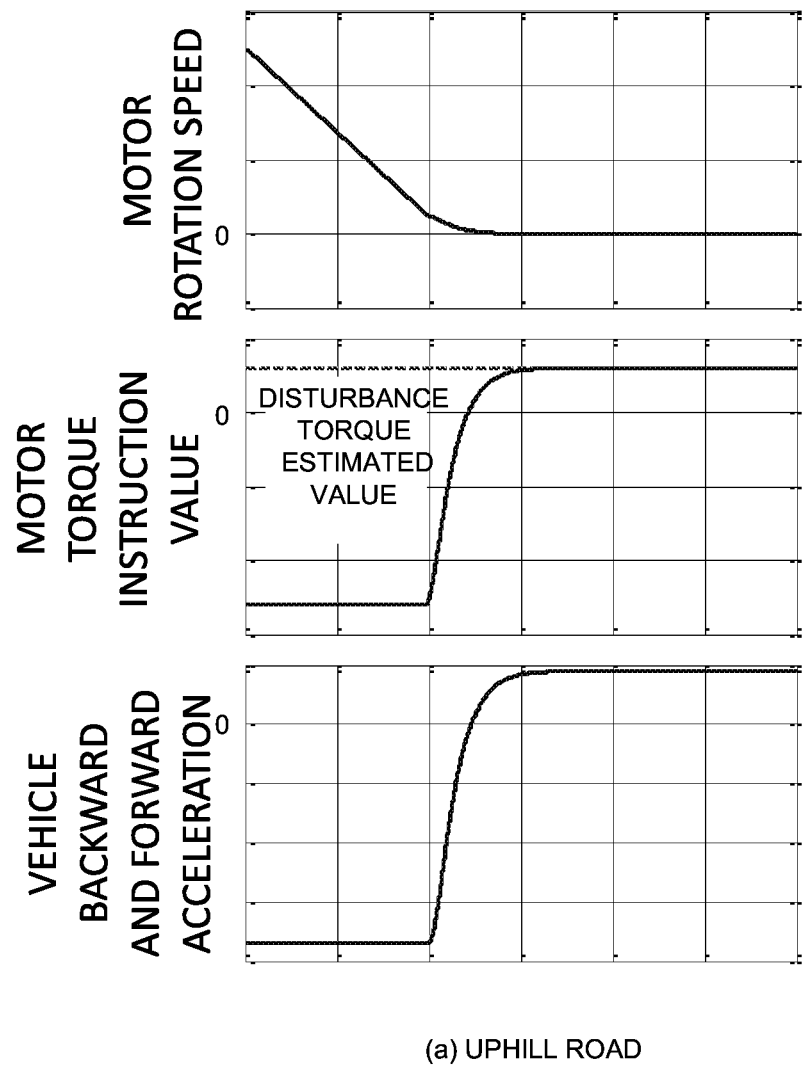
FIG. 12A is a chart showing control results in the case of stopping a vehicle on an uphill road.
Figure 12B:
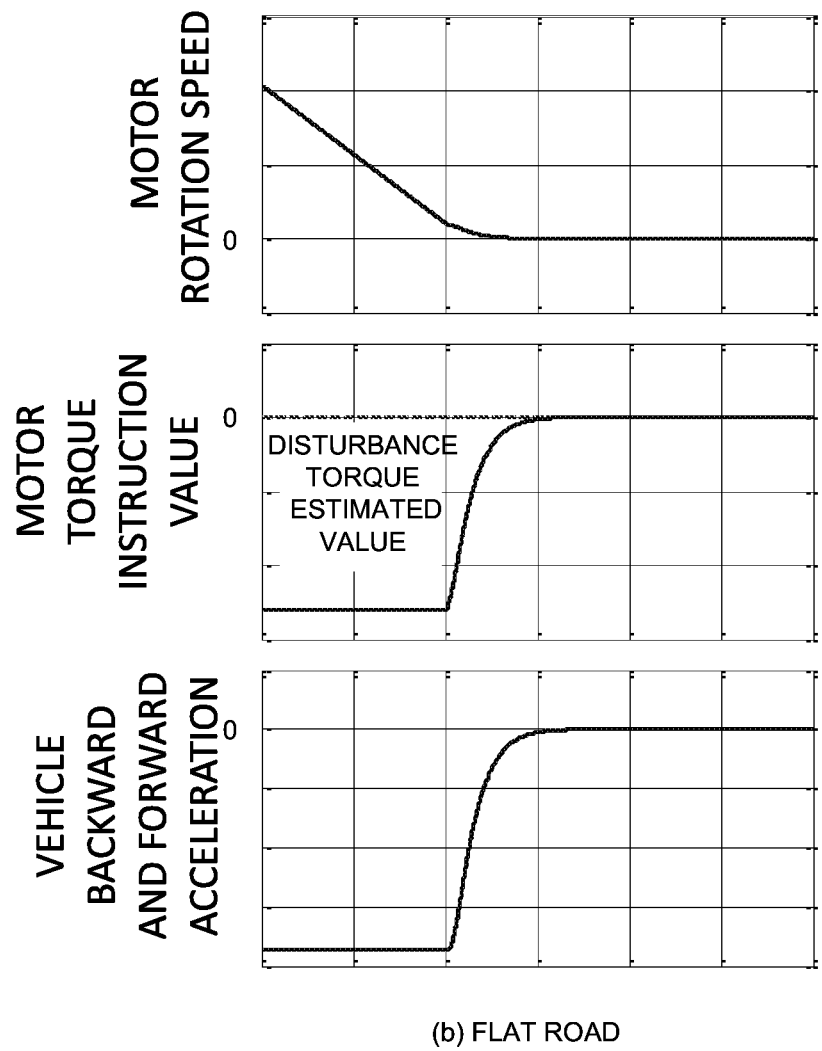
FIG. 12B is a chart showing control results in the case of stopping the vehicle on a flat road.
Figure 12C:
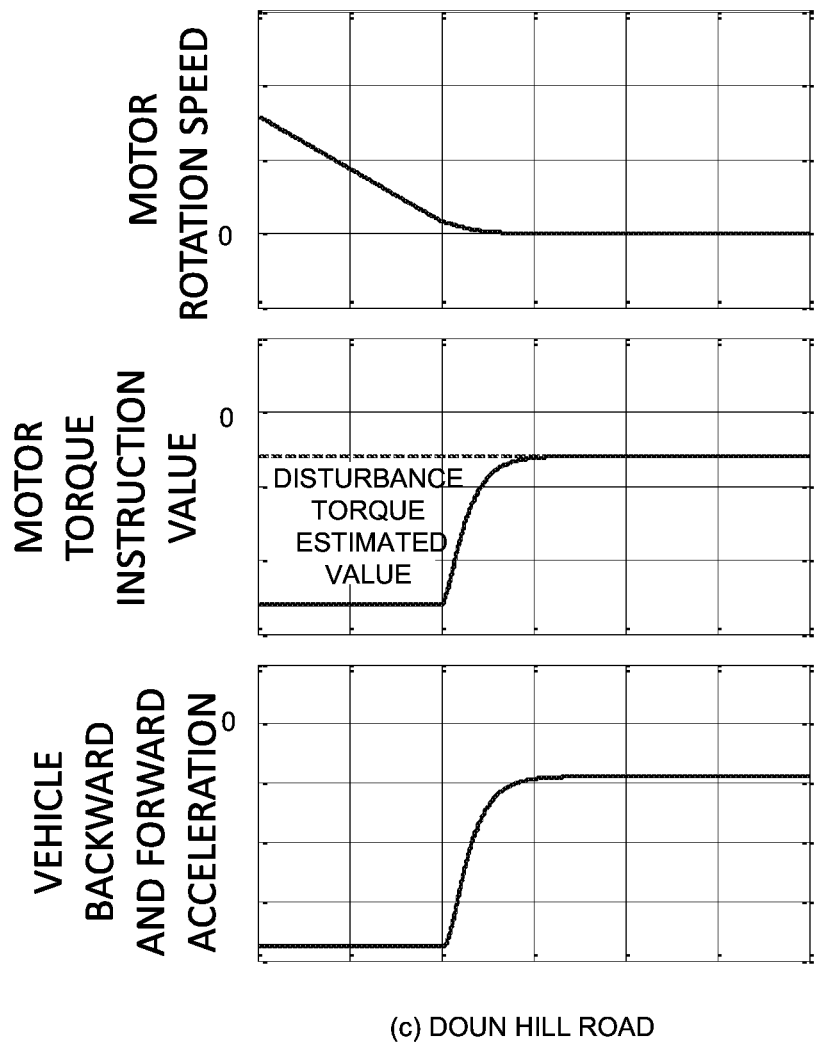
FIG. 12C is a chart showing control results in the case of stopping the vehicle on a downhill road.

FIGS. 12A to 12C are charts showing examples of control results by the control device for electric motor vehicle in the one embodiment.

FIGS. 12A to 12C respectively show the control results in the case of stopping the vehicle on an uphill road, on a flat road and on a downhill road, and the motor rotation speed, the motor torque command value and the vehicle longitudinal acceleration are shown successively from top in each figure.

At time t10, the electric motor 4 is decelerated on the basis of the first torque target value Tm1* calculated in Step S202 of FIG. 2.

At time t11, the just-before-stop judgment torque becomes larger than the first torque target value Tm1* and it is judged that the vehicle stops shortly, whereby the motor torque command value Tm* is switched from the first torque target value Tm1* to the second torque target value Tm2*. Thereafter, the motor torque command value Tm* approaches the disturbance torque estimated value Td little by little as the motor rotation speed ωm decreases.

At time t13, the motor torque command value Tm* converges to the disturbance torque estimated value Td regardless of the uphill road, the flat road or the downhill road as shown in FIGS. 12A to 12C. This enables the realization of a smooth vehicle stop free from acceleration vibration in the front-back direction when the vehicle stops. After time t12, the motor rotation speed ωm is zero regardless of the uphill road, the flat road or the downhill road and the vehicle stopped state is found to be maintained.

Next, control results by the control device for electric motor vehicle in a more specific embodiment taking into account an accelerator operation amount are described with reference to FIGS. 13 to 15.

Figure 13:
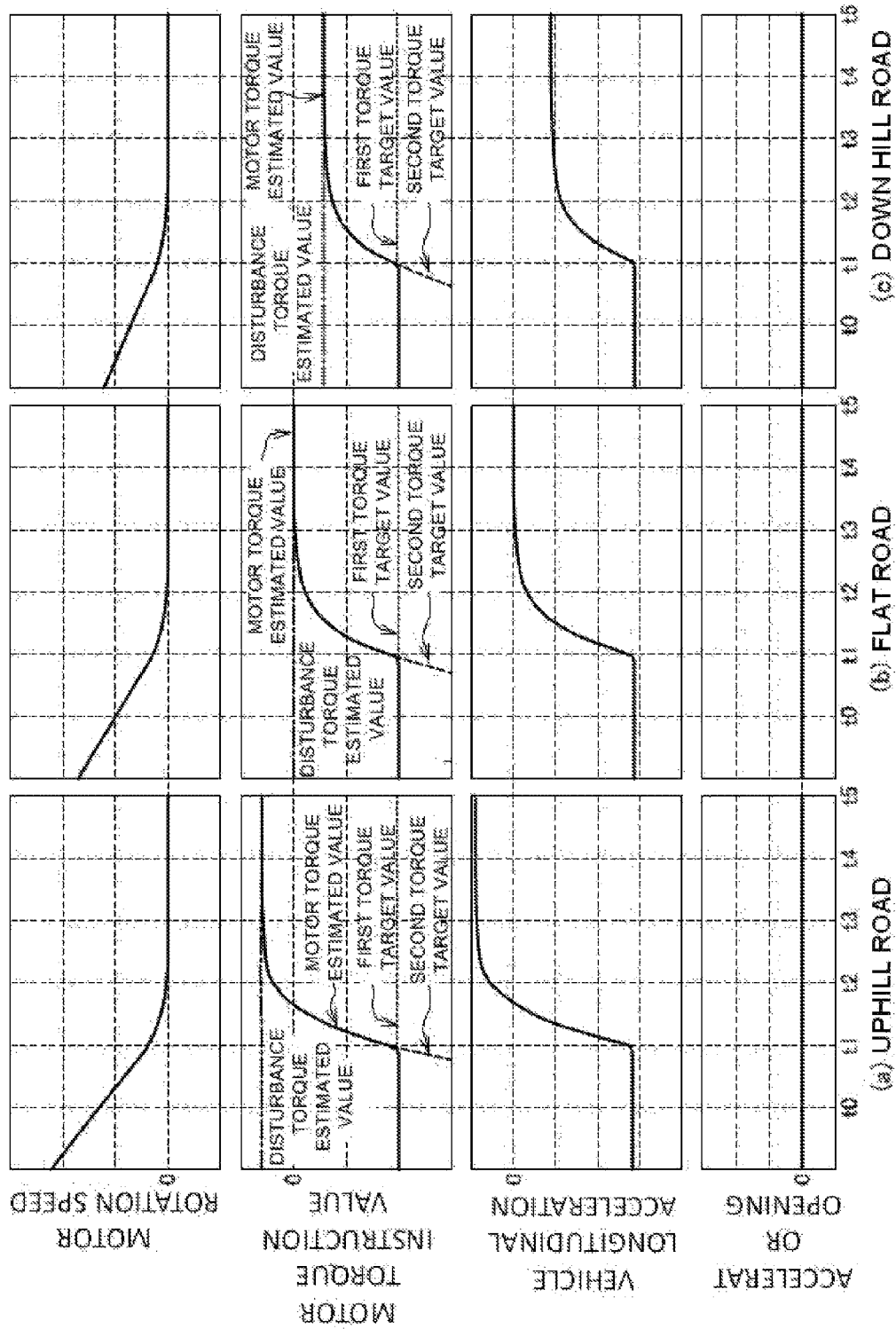
FIG. 13 is a time chart showing an example of control results by the control device for electric motor vehicle in the one embodiment when an accelerator operation amount is zero.
Figure 14:
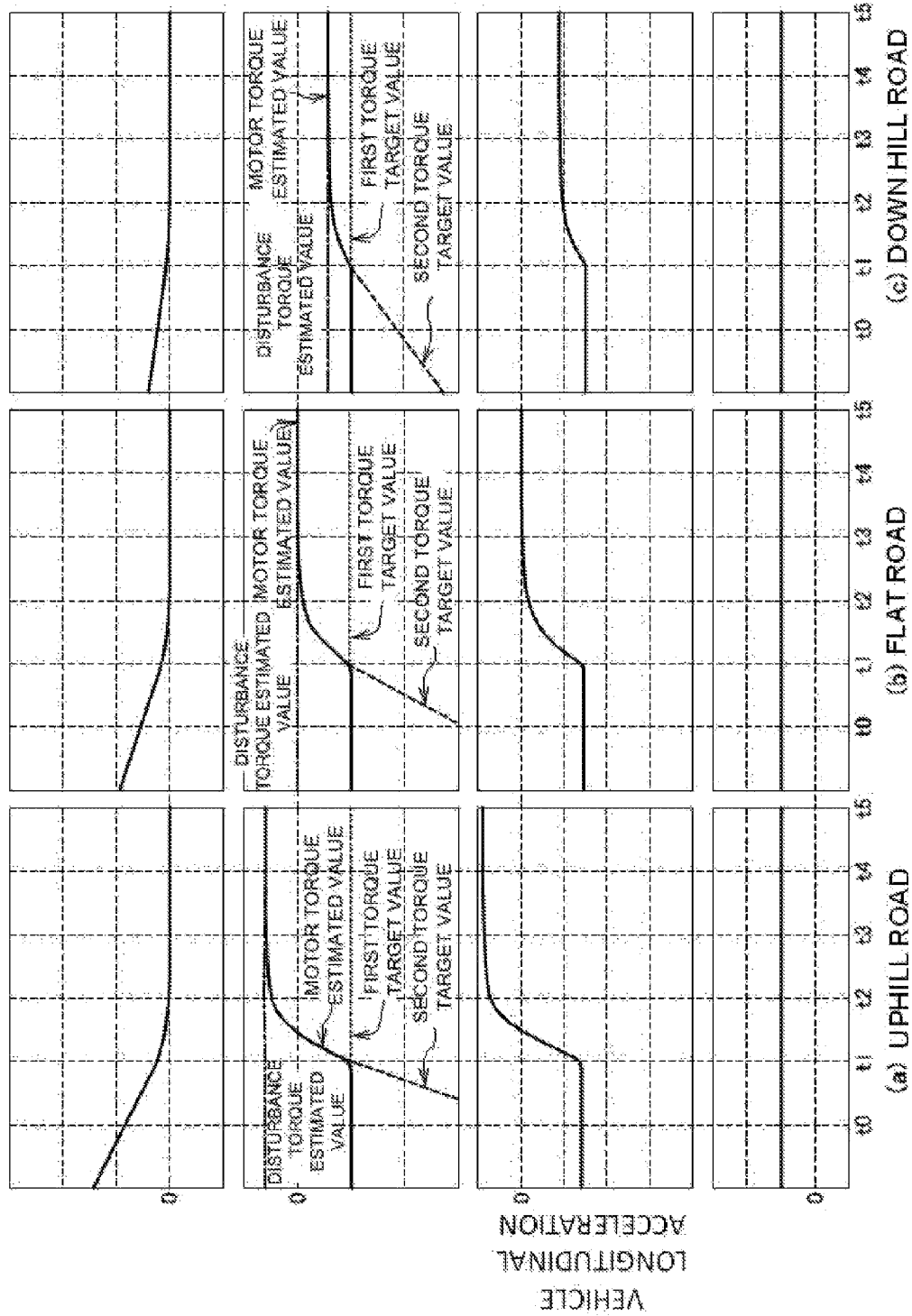
FIG. 14 is a time chart showing an example of control results by the control device for electric motor vehicle in the one embodiment when the accelerator operation amount is constant.
Figure 15:
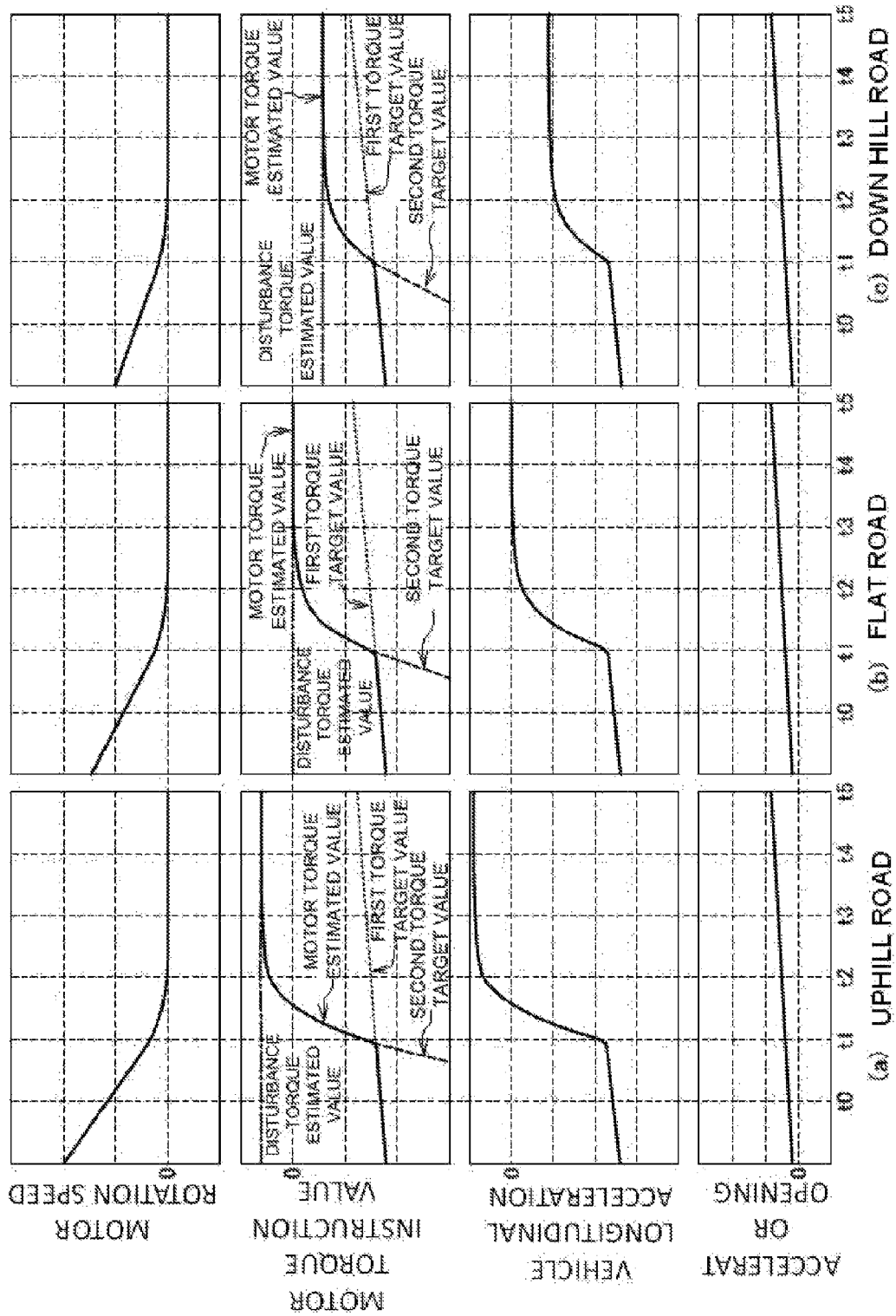
FIG. 15 is a time chart showing an example of control results by the control device for electric motor vehicle in the one embodiment when the accelerator operation amount is gradually increased.

FIGS. 13 to 15 are charts showing examples of control results by the control device for electric motor vehicle in the one embodiment as in FIG. 12. FIG. 13 shows the control results when the accelerator operation amount is zero, FIG. 14 shows the control results when the accelerator operation amount is constant and FIG. 15 shows the control results when the accelerator operation amount is gradually increased. FIG. 13(a) to (c), FIG. 14(a) to (c) and FIG. 15(a) to (c) respectively show the control results in the case of stopping the vehicle on an uphill road, on a flat road and on a downhill road. Further, in each figure, the motor rotation speed, the motor torque command value, the vehicle longitudinal acceleration and the accelerator pedal opening are shown successively from top.

Further, in charts of FIGS. 13 to 15 showing the motor torque command value, the first torque target value (dotted line) and the second torque target value (broken line) are shown in addition to the motor torque command value (solid line) and the disturbance torque estimated value (dashed-dotted line).

At time t0, the electric motor is decelerated on the basis of the first torque target value Tm1* calculated in Step S202 of FIG. 2.

At time t1, the just-before-stop judgment torque becomes larger than the first torque target value Tm1* and it is judged that the vehicle stops shortly, whereby the motor torque command value Tm* is switched from the first torque target value Tm1* to the second torque target value Tm2*. Thereafter, the motor torque command value Tm* approaches the disturbance torque estimated value Td little by little as the motor rotation speed ωm decreases. During this time, as shown in FIGS. 9 to 11, the motor torque command value Tm* converges to the disturbance torque estimated value Td without depending on the accelerator operation amount.

At time t3, the motor torque command value Tm* converges to the disturbance torque estimated value Td regardless of the accelerator pedal opening and the road surface condition (uphill road, flat road or downhill road) as shown in charts (a) to (c) of FIGS. 13 to 15. This enables the realization of a smooth vehicle stop free from acceleration vibration in the front-back direction when the vehicle stops. After time t3, the motor rotation speed ωm is 0 regardless of the accelerator pedal opening and the road surface condition and the vehicle stopped state is found to be maintained.

As just described, when the just-before-stop judgment torque becomes larger than the first torque target value Tm1* and it is judged that the vehicle stops shortly, the motor torque command value Tm* is switched from the first torque target value Tm1* to the second torque target value Tm2* regardless of the accelerator operation amount and converges to the disturbance torque estimated value with a reduction in the motor rotation speed. It should be noted that non-smooth parts not seen in FIG. 12 are present immediately before t2 of charts (a) of FIGS. 13 to 15 showing the motor torque command value and the vehicle longitudinal acceleration, but they appear for the sake of drafting and do not affect functions and effects of the present application.

Figure 16:
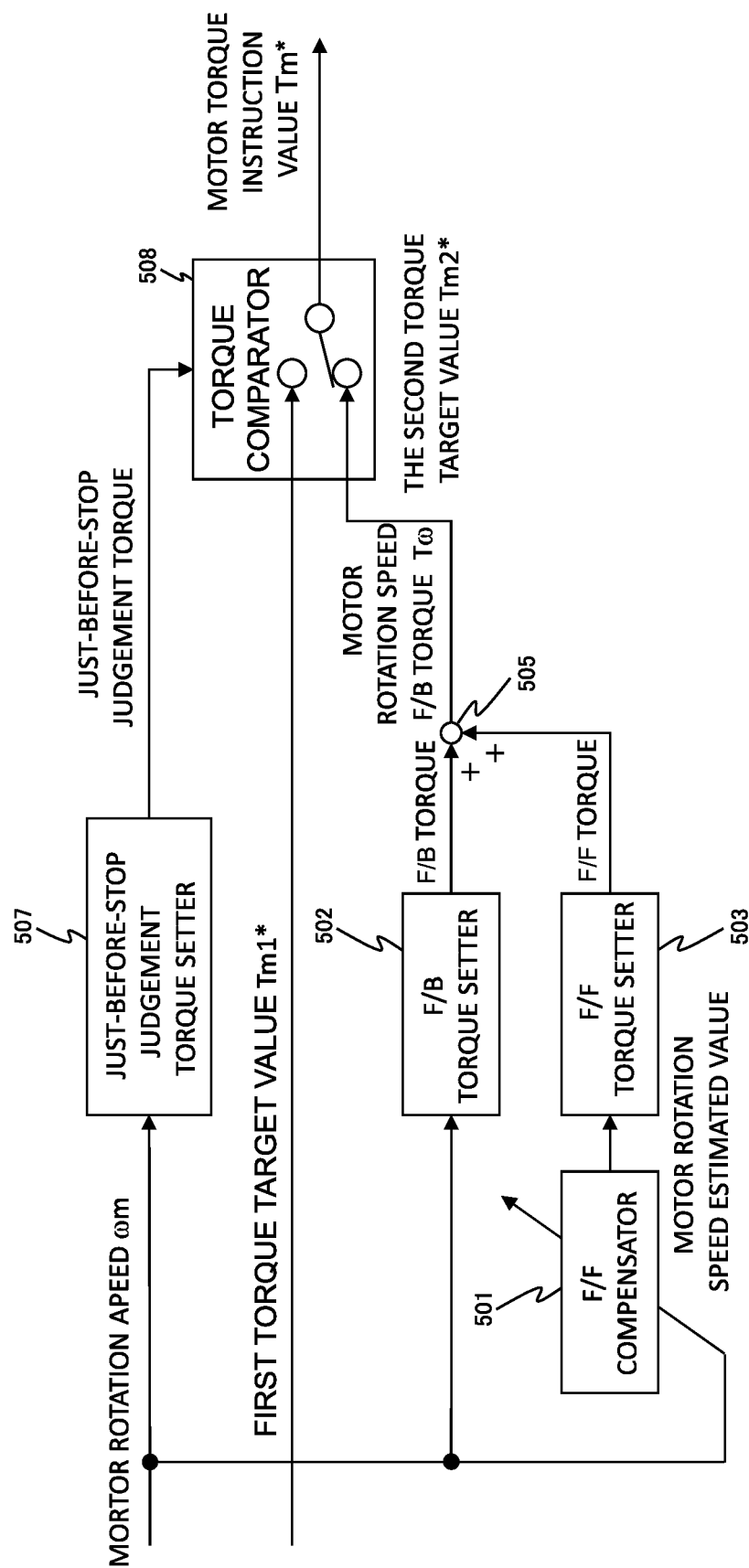
FIG. 16 is a block diagram for realizing the stop control process in the case of setting a motor rotation speed F/B torque as a second torque target value.

Here, although the second torque target value Tm2* is calculated by adding the motor rotation speed F/B torque Tw and the disturbance torque estimated value Td in the above description, the motor rotation speed F/B torque Tw may be set as the second torque target value Tm2*. FIG. 16 is a block diagram for realizing the stop control process in the case of setting the motor rotation speed F/B torque Tw as the second torque target value Tm2*. In FIG. 16, the same constituent elements as those shown in FIG. 5 are denoted by the same reference signs.

Also in the case of setting the motor rotation speed F/B torque Tw as the second torque target value Tm2*, the motor torque command value Tm* is switched from the first torque target value Tm1* to the second torque target value Tm2* when the just-before-stop judgment torque becomes larger than the first torque target value Tm1* and it is judged that the vehicle stops shortly. At this time, the motor torque command value Tm* converges to zero as the motor rotation speed ωm decreases since the second torque target value Tm2* is substantially equal to the motor rotation speed F/B torque Tω.

As described above, the controller 4, which is the control device for electric motor vehicle in the one embodiment, uses the electric motor 4 as a motor as a traveling drive source, decelerates the vehicle by the regenerative braking force of the electric motor 4, detects the accelerator operation amount, calculates the motor torque command value and controls the electric motor 4 on the basis of the calculated motor torque command value.

Together with this, the motor rotation speed ωm is detected as a speed parameter proportional to the traveling speed of the electric motor vehicle, and the F/B (feedback) torque for stopping the electric motor vehicle is calculated on the basis of the motor rotation speed ωm. Further, the motor rotation speed as the speed parameter is estimated in accordance with the state of the electric motor vehicle, and the F/F (feedforward) torque for compensating for the F/B torque is calculated on the basis of that estimated value (motor rotation speed estimated value).

When the accelerator operation amount is not larger than a predetermined value and the electric motor vehicle stops shortly, the motor torque command value Tm* is converged to zero on the basis of the F/B torque and the F/F torque with a reduction in the speed parameter proportional to the traveling speed. Specifically, the controller 4 functions as accelerator operation amount detecting means, vehicle speed detecting means, vehicle speed estimating means, feedback torque calculating means, feedforward torque calculating means, motor torque command value calculating means and motor control means. It should be noted that the accelerator operation amount of not larger than the predetermined value is intended to be an accelerator operation amount when the vehicle is traveling at a sufficiently low speed (e.g. a speed of 15 km/h or lower) without the intervention of a braking device separately from regenerative braking. It should be noted that, needless to say, the exemplary vehicle speed is an example.

In this way, the motor torque command value is converged to zero with a reduction in the traveling speed of the electric motor vehicle when the accelerator operation amount is not larger than the predetermined value and the electric motor vehicle stops shortly. Thus, a smooth deceleration free from acceleration vibration in the front-back direction can be realized just before the vehicle stops. Particularly on a flat road, a smooth deceleration free from acceleration vibration in the front-back direction can be realized just before the vehicle stops and the vehicle stopped state can be held. It should be noted that a reduction in the traveling speed means the approach of the vehicle speed toward zero.

Furthermore, by using the F/F torque in conjunction with the F/B torque, the F/B torque can be reduced to suppress the vibration of the motor torque command value Tm* and a shortage of the F/B torque can be compensated for by the F/F torque. Thus, the stability of the control system can be ensured without extending the braking distance.

Further, since the vehicle can be decelerated up to the vehicle stopped state even without using the braking force by mechanical braking means such as a foot brake, the regenerative operation of the electric motor 4 is possible also just before the vehicle stops and electric power consumption can be improved. Furthermore, since the acceleration/deceleration and the stop of the vehicle can be realized only by the accelerator operation, it is not necessary to switchingly depress the accelerator pedal and a brake pedal and burdens on the driver can be reduced.

In the case of stopping the vehicle using the brake pedal, a driver not used to driving depresses the accelerator pedal too much to generate acceleration vibration in the front-back direction of the vehicle when the vehicle stops. Further, if it is attempted to realize the deceleration and the stop of the vehicle at a constant deceleration in the vehicle for realizing the acceleration/deceleration and the stop of the vehicle only by the accelerator operation, the deceleration needs to be increased to realize a sufficient deceleration during deceleration. Thus, acceleration vibration is generated in the front-back direction of the vehicle when the vehicle stops. However, in accordance with the control device for electric motor vehicle in the one embodiment, any driver can realize smooth deceleration and stop only by the accelerator operation as described above.

Further, in the control device for electric motor vehicle in the one embodiment, the F/B torque is calculated by multiplying the detected motor rotation speed ωm by the predetermined gain K1 for distributing the regenerative braking force of the motor and the F/F torque is calculated by multiplying the motor rotation speed estimated value by the specific gain K2 set in accordance with the predetermined gain K1. When the accelerator operation amount is not larger than the predetermined value and the electric motor vehicle stops shortly, the motor rotation speed F/B torque Tω obtained by adding the F/F torque to the F/B torque is set as the motor torque command value Tm*.

Since the motor rotation speed F/B torque Tω works as viscosity (damper), the motor rotation speed ωm smoothly (asymptotically) converges to zero just before the vehicle stops. In this way, a smooth vehicle stop free from shock to the longitudinal acceleration can be realized.

Further, in the control device for electric motor vehicle in the one embodiment, the predetermined gain K1 is set at a value smaller than zero and larger than the total gain Kvref necessary to stop of the vehicle. The specific gain K2 is set at a value obtained by subtracting the predetermined gain K1 from the total gain Kvref. Specifically, the gains K1 and K2 are set to satisfy the following relationship.

[Equation 11]

$$K_{vref} = K1 + K2 \quad (11)$$

By distributing the total gain Kvref to the gains K1 and K2 to satisfy the relationship of equation (11), the stability of the control system can be ensured without extending the braking distance. Thus, setting suitable for the system is possible.

Furthermore, the control device for electric motor vehicle in the one embodiment includes the F/F compensator 501 for calculating the motor rotation speed estimated value on the basis of the vehicle model Gp(s) and converging the motor torque estimated value to be input to the vehicle model Gp(s) to zero with a reduction in the motor rotation speed estimated value. The motor rotation speed estimated value is obtained by the F/F compensator 501. It should be noted that the vehicle model Gp(s) is modeling the transmission characteristic of the torque input to the electric motor vehicle and the rotation speed of the electric motor 4 as shown in equation (6).

By providing the F/F compensator 501, the motor rotation speed can be estimated by the open loop. Thus, the F/F torque that does not cause a vibration of the motor torque command value Tm* can be calculated from the motor rotation speed estimated value and a shortage of the F/B torque can be compensated for without affecting the stability of the control system by adding the F/F torque to the F/B torque.

Further, in the control device for electric motor vehicle in the one embodiment, the F/F compensator 501 calculates the motor torque estimated value by multiplying the motor rotation speed estimated value by the total gain Kvref and calculates the motor rotation speed estimated value by inputting that motor torque estimated value to the vehicle model Gp(s).

Since the motor torque estimated value works as a viscosity (damper) element for a dynamic characteristic from the motor torque estimated value to the motor rotation speed estimated value, the motor rotation speed estimated value smoothly (asymptotically) converges to zero just before the vehicle stops. In this way, a smooth vehicle stop free from shock to the longitudinal acceleration can be realized.

Further, in the control device for electric motor vehicle in the one embodiment, the simplified vehicle model Gp'(s) of equation (10) is used as the vehicle model Gp(s) in the F/F compensator 501. The F/F compensator 501 applies the predetermined low-pass filtering Hc(s) to the motor rotation speed estimated value to be output to the F/F torque setter 503. Further, the F/F compensator 501 inputs the motor torque estimated value obtained by multiplying the motor rotation speed estimated value by the total gain Kvref to the simplified vehicle model Gp'(s), the motor rotation speed estimated value is not subjected to the low-pass filtering Hc(s).

As just described, the simplified vehicle model Gp'(s) is used and the low-pass filtering Hc(s) is performed only for the motor rotation speed estimated value used in the calculation of the F/F torque. From this, a deviation of the response characteristic of the F/F torque associated with the use of the simplified vehicle model Gp'(s) can be adjusted.

Accordingly, it is possible to reduce a calculation amount while ensuring the estimation accuracy of the motor rotation speed by the F/F compensator 501.

Further, the controller 4 as the control device for electric motor vehicle in the one embodiment functions as first torque target value calculation means for calculating the first torque target value Tm1* on the basis of vehicle information, second torque target value calculation means for calculating the motor rotation speed feedback torque Tω as the second torque target value Tm2*, just-before-stop judgment torque calculation means for calculating the just-before-stop judgment torque by adding the disturbance torque to the value obtained by multiplying the motor rotation speed ωm by the predetermined total gain Kvref and torque comparison means for comparing the magnitudes of the first torque target value Tm1* and the just-before-stop judgment torque. If the just-before-stop judgment torque is judged to be larger than the first torque target value Tm1*, it is judged that the vehicle stops shortly and the motor torque command value Tm* is switched from the first torque target value Tm1* to the second torque target value Tm2*.

In this way, a smooth vehicle stop from deceleration can be realized by a switch to the second torque target value Tm2* just before the vehicle stops after the vehicle is decelerated using the first torque target value Tm1* based on the vehicle information. Further, since the larger one of the first and second torque target values Tm1* and Tm2* is set as the motor torque command value Tm*, a smooth deceleration can be realized without generating a torque difference at a timing of switching the torque target value at any gradient.

Further, the controller 4 as the control device for electric motor vehicle in the one embodiment functions as disturbance torque estimation means for estimating the disturbance torque and converges the motor torque command value Tm* to the disturbance torque with a reduction in the motor rotation speed when the accelerator operation amount is not larger than the predetermined value and the electric motor vehicle stops shortly.

In this way, regardless of the uphill road, the downhill road or the flat road, a smooth deceleration free from acceleration vibration in the front-back direction can be realized just before the vehicle stops and the vehicle stopped state can be held.

Since the disturbance torque is a positive value on the uphill road and a negative value on the downhill road, the vehicle smoothly stops also on slopes and the vehicle stopped state can be held without requiring foot braking. Further, since the disturbance torque estimated value Td is zero on the flat road, the vehicle can smoothly stop and the vehicle stopped state can be held without requiring foot braking on the flat road.

In the control device for electric motor vehicle in the one embodiment, the motor rotation speed ωm is detected, and the motor rotation speed feedback torque Tω is calculated by multiplying the detected motor rotation speed ωm by the predetermined gain Kvref. Then, the sum of the motor rotation speed feedback torque Tω and the disturbance torque Td is calculated as the motor torque command value Tm* when the accelerator operation amount is not larger than the predetermined value and the electric motor vehicle stops shortly.

Since the motor rotation speed feedback torque Tw works as viscosity (damper) for the dynamic characteristic from the motor torque to the motor rotation speed, the motor rotation speed ωm smoothly (asymptotically) converges to zero just before the vehicle stops. This can realize a smooth vehicle stop having the longitudinal acceleration vibration suppressed.

Further, since the disturbance torque is estimated on the basis of the model Gp(s) of the transmission characteristic of the torque input to the vehicle and the rotation speed of the motor, the disturbance torque estimated value Td can be accurately obtained.

Particularly, the first motor torque estimated value is calculated by inputting the motor rotation speed ωm to the filter having the transmission characteristic H(s)/Gp(s) composed of the model Gp(s) and such a transmission characteristic H(s) that the difference between the denominator degree and the numerator degree thereof is not smaller than the difference between the denominator degree and the numerator degree of the model Gp(s), the second motor torque estimated value is calculated by inputting the motor torque command value Tm* to the filter having the transmission characteristic H(s) and the disturbance torque estimated value Td is obtained by calculating a deviation between the first and second motor torque estimated values. In this way, the disturbance torque estimated value Td can be accurately obtained.

The controller 4 as the control device for electric motor vehicle in the one embodiment functions as the first torque target value calculation means for calculating the first torque target value Tm1* on the basis of the vehicle information, the second torque target value calculation means for calculating the second torque target value Tm2* that converges to the disturbance torque estimated value Td with a reduction in the motor rotation speed ωm, the just-before-stop judgment torque calculation means for calculating the just-before-stop judgment torque by adding the disturbance torque to the value obtained by multiplying the motor rotation speed ωm by the predetermined total gain Kvref and the torque comparison means for comparing the magnitudes of the first torque target value Tm1* and the just-before-stop judgment torque. If the just-before-stop judgment torque is judged to be larger than the first torque target value Tm1*, it is judged that the vehicle stops shortly and the motor torque command value Tm* is switched from the first torque target value Tm1* to the second torque target value Tm2*.

In this way, a smooth vehicle stop from deceleration can be realized by making a switch to the second torque target value Tm2* just before the vehicle stops after the vehicle is decelerated using the first torque target value Tm1* based on the vehicle information.

The present invention is not limited to the one embodiment described above. For example, an example of detecting the motor rotation speed as the speed parameter proportional to the traveling speed of the electric motor vehicle is described in the above description. However, a wheel speed, a vehicle body speed and a rotation speed of the drive shaft can also be used as speed parameters since they are in a proportional relationship with the traveling speed of the vehicle.

For example, the wheel speed may be detected as the speed parameter proportional to the traveling speed of the electric motor vehicle, the F/B torque may be calculated on the basis of the wheel speed, the wheel speed may be estimated in accordance with the state of the electric motor vehicle and the F/F torque may be calculated based on the estimated value. When the accelerator operation amount is not larger than the predetermined value and the electric motor vehicle stops shortly, the motor torque command value Tm* is converged to zero on the basis of the F/B torque and the F/F torque with a reduction in the traveling speed obtained by the wheel speed. Even if the speed parameter other than the motor rotation speed is used in this way, effects similar to those of the present embodiment are obtained.

Further, the torque comparator 508 is described to determine that the vehicle stops shortly and switch the motor torque command value Tm* from the first torque target value Tm1* to the second torque target value Tm2* when judging that the just-before-stop judgment torque is larger than the first torque target value Tm1*. However, the torque comparator 508 may compare the magnitudes of the first and second torque target values Tm1*, Tm2* and set the larger value as the motor torque command value Tm*.

Although the embodiment of the present invention has been described above, the above embodiment is merely one application example of the present invention and not of the nature to limit the technical scope of the present invention to the specific configuration of the above embodiment.

The invention claimed is:

1. A control device for electric motor vehicle using a motor as a traveling drive source and configured to control vehicle speed from decelerating state to a stopped stated by a regenerative braking force of the motor, comprising:
    an accelerator pedal for instructing acceleration, deceleration, and stop of the vehicle;
    an accelerator operation amount detecting unit configured to detect an accelerator operation amount, the accelerator operation amount is a state of operation of the accelerator pedal;
    a vehicle speed detecting unit configured to detect a speed parameter proportional to a traveling speed of the electric motor vehicle;
    a vehicle speed estimating unit configured to estimate the speed parameter in accordance with a state of the electric motor vehicle;
    a feedback torque calculating unit configured to calculate a feedback torque for stopping the electric motor vehicle on the basis of the speed parameter detected by the vehicle speed detection unit;
    a feedforward torque calculating unit configured to calculate a feedforward torque for compensating for a shortage of the feedback torque on the basis of the speed parameter estimated by the vehicle speed estimation unit, the feedforward torque being configured to shorten a braking distance by compensating for the shortage of the feedback torque;
    a motor torque command value calculating unit configured to calculate a motor torque command value; and
    a motor control unit configured to control the motor on the basis of the motor torque command value;
    wherein the motor torque command value calculating unit converges the motor torque command value to zero on the basis of the feedback torque and the feedforward torque with a reduction in the traveling speed, when the pedal is operated so that the accelerator operation amount is to be a predetermined value or less and the electric motor vehicle stops shortly.

2. The control device for electric motor vehicle according to claim 1, wherein:
the feedback torque calculating unit calculates the feedback torque by multiplying the speed parameter detected by the vehicle speed detection unit by a predetermined gain K1 for distributing an allotment ratio of the feedback torque and the feedforward torque as torques by which a regenerative braking force of the motor is obtained;
the feedforward torque calculating unit calculates the feedforward torque by multiplying the speed parameter estimated by the vehicle speed estimating unit by a specific gain K2, the specific gain K2 being set to be smaller in accordance with an increase in the predetermined gain K1; and
the motor torque command value calculating unit sets a speed feedback torque obtained by adding the feedforward torque to the feedback torque as the motor torque command value when the accelerator operation amount is not larger than the predetermined value and the electric motor vehicle stops shortly.

3. The control device for electric motor vehicle according to claim 2, wherein:
the predetermined gain K1 is set at a value smaller than zero and larger than a total gain Kvref determined to converge the motor torque command value to zero; and
the specific gain K2 is set at a value obtained by subtracting the predetermined gain K1 from the total gain Kvref.

4. The control device for electric motor vehicle according to claim 1, wherein:
the vehicle speed estimating unit includes a feedforward compensator for estimating a rotation speed of the motor on the basis of a model Gp(s) of a transmission characteristic of torque input to the electric motor vehicle and the rotation speed of the motor and converging a motor torque estimated value to be input to the model Gp(s) to zero with a reduction in the rotation speed of the motor; and
the vehicle speed estimating unit obtains the rotation speed of the motor estimated by the feedforward compensator as the speed parameter.

5. The control device for electric motor vehicle according to claim 4, wherein:
the feedforward compensator calculates the motor torque estimated value by multiplying an estimated value of the rotation speed of the motor by a predetermined total gain Kvref, which is a negative value, and inputs the motor torque estimated value to the model Gp(s) and outputs the estimated value of the rotation speed of the motor.

6. The control device for electric motor vehicle according to claim 5, wherein:
the feedforward compensator uses a simplified model Gp'(s) as the model Gp(s) to apply predetermined low-pass filtering Hc(s) to the estimated value of the rotation speed of the motor to be output to the feedforward torque calculating unit, the simplified model Gp'(s) being expressed as a linear function, the linear function being obtained by simplifying the model Gp(s);
the feedforward compensator inputs the motor torque estimated value to the simplified model Gp'(s), the motor torque estimated value being obtained by multiplying the estimated value by the total gain Kvref, the estimated value being not subjected to the low-pass filtering Hc(s).

7. The control device for electric motor vehicle according to claim 2, further comprising:
a first torque target value calculating unit configured to calculate a first torque target value on the basis of vehicle information;
a second torque target value calculating unit configured to calculate the speed feedback torque as a second torque target value;
a just-before-stop judgment torque calculating unit configured to calculate a just-before-stop judgment torque by multiplying the speed parameter detected by the vehicle speed detection unit by a predetermined total gain Kvref, which is a negative value; and
a torque comparison unit configured to compare the magnitudes of the first torque target value and the just-before-stop judgment torque, wherein:
the motor torque command value calculating unit judges that the vehicle stops shortly and switches the motor torque command value from the first torque target value to the second torque target value when judging that the just-before-stop judgment torque is larger than the first torque target value.

8. The control device for electric motor vehicle according to claim 1, further comprising:
a disturbance torque estimating unit configured to estimate a disturbance torque,
wherein the motor torque command value calculating unit converges the motor torque command value to the disturbance torque on the basis of the feedback torque and the feedforward torque with a reduction in the traveling speed when the accelerator operation amount is not larger than the predetermined value and the electric motor vehicle stops shortly.

9. The control device for electric motor vehicle according to claim 8, wherein:
the disturbance torque estimating unit estimates the disturbance torque to be a positive value on an uphill road and a negative value on a downhill road.

10. The control device for electric motor vehicle according to claim 8, wherein:
the disturbance torque estimation unit sets the disturbance torque at zero on a flat road.

11. The control device for electric motor vehicle according to claim 8, wherein:
the motor torque command value calculating unit calculates the sum of a speed feedback torque obtained by adding the feedforward torque to the feedback torque and the disturbance torque as the motor torque command value when the accelerator operation amount is not larger than the predetermined value and the electric motor vehicle stops shortly.

12. The control device for electric motor vehicle according to claim 8, further comprising:
a first torque target value calculating unit configured to calculate a first torque target value on the basis of vehicle information;
a second torque target value calculating unit configured to calculate a second torque target value, the second torque target value converging to the disturbance torque with a reduction in the speed parameter detected by the vehicle speed detecting unit;
a just-before-stop judgment torque calculating unit configured to calculate a just-before-stop judgment torque by adding the disturbance torque to a value obtained by multiplying the speed parameter detected by the vehicle speed detecting unit by a predetermined total gain Kvref, which is a negative value; and a torque comparison unit configured to compare the magnitudes of the first torque target value and the just-before-stop judgment torque, wherein:

the motor torque command value calculating unit judges that the vehicle stops shortly and switches the motor torque command value from the first torque target value to the second torque target value when judging that the just-before-stop judgment torque is larger than the first torque target value.

13. A control method for electric motor vehicle using a motor as a traveling drive source, and having an accelerator pedal for instructing acceleration, deceleration, and stop of the vehicle, and configured to control a vehicle speed from deceleration state to a stopped state by a regenerative braking force of the motor, the method comprising:

an accelerator operation amount detection step of detecting an accelerator operation amount;
a vehicle speed detection step of detecting a speed parameter proportional to a traveling speed of the electric motor vehicle;
a vehicle speed estimation step of estimating the speed parameter in accordance with a state of the electric motor vehicle;
a feedback torque calculation step of calculating a feedback torque for stopping the electric motor vehicle on the basis of the speed parameter detected in the vehicle speed detection step;
a feedforward torque calculation step of calculating a feedforward torque for compensating for a shortage of the feedback torque on the basis of the speed parameter estimated in the vehicle speed estimation step, the feedforward torque being configured to shorten a braking distance by compensating for the shortage of the feedback torque;
a motor torque command value calculation step of calculating a motor torque command value; and
a motor control step of controlling the motor on the basis of the motor torque command value, wherein:
in the motor torque command value calculation step, the motor torque command value is converged to zero on the basis of the feedback torque and the feedforward torque with a reduction in the traveling speed when the pedal is operated so that the accelerator operation amount is to be a predetermined value or less and the electric motor vehicle stops shortly.

14. A control device for electric motor vehicle using a motor as a traveling drive source and configured to control a vehicle speed from decelerating state to a stopped state by a regenerative braking force of the motor, comprising:

an accelerator pedal for instructing acceleration, deceleration, and stop of the vehicle;
an accelerator operation amount detecting unit configured to detect an accelerator operation amount, the accelerator operation amount is a state of operation of the accelerator pedal;
a vehicle speed detecting unit configured to detect a speed parameter proportional to a traveling speed of the electric motor vehicle;
a vehicle speed estimating unit configured to estimate the speed parameter in accordance with a state of the electric motor vehicle;
a feedback torque calculating unit configured to calculate a feedback torque for stopping the electric motor vehicle on the basis of the speed parameter detected by the vehicle speed detection unit;
a feedforward torque calculating unit configured to calculate a feedforward torque for compensating for a shortage of the feedback torque on the basis of the speed parameter estimated by the vehicle speed estimation unit, the feedforward torque being configured to shorten a braking distance by compensating for the shortage of the feedback torque;
a disturbance torque estimating unit configured to estimating a disturbance torque
a motor torque command value calculating unit configured to calculate a motor torque command value; and
a motor control unit configured to control the motor on the basis of the motor torque command value, wherein:
the motor torque command value calculating unit converges the motor torque command value to the disturbance torque on the basis of the feedback torque and the feedforward torque with a reduction in the traveling speed when the pedal is operated so that the accelerator operation amount is to be a predetermined value or less and the electric motor vehicle stops shortly.

15. A control method for electric motor vehicle using a motor as a traveling drive source, and having an accelerator pedal for instructing acceleration, deceleration, and stop of the vehicle, and configured to control vehicle speed from decelerating state to a stopped state by a regenerative braking force of the motor, the method comprising:

an accelerator operation amount detection step of detecting an accelerator operation amount, the accelerator operation amount is a state of operation of the accelerator pedal;
a vehicle speed detection step of detecting a speed parameter proportional to a traveling speed of the electric motor vehicle;
a vehicle speed estimation step of estimating the speed parameter in accordance with a state of the electric motor vehicle;
a feedback torque calculation step of calculating a feedback torque for stopping the electric motor vehicle on the basis of the speed parameter detected by the vehicle speed detection unit;
a feedforward torque calculation step of calculating a feedforward torque for compensating for a shortage of the feedback torque on the basis of the speed parameter estimated by the vehicle speed estimation unit, the feedforward torque being configured to shorten a braking distance by compensating for the shortage of the feedback torque;
a disturbance torque estimation step of estimating a disturbance torque,
a motor torque command value calculation step of calculating a motor torque command value; and
a motor control step of controlling the motor on the basis of the motor torque command value, wherein:
in the motor torque command value calculation step, the motor torque command value is converged to the disturbance torque on the basis of the feedback torque and the feedforward torque with a reduction in the traveling speed when the pedal is operated so that the accelerator operation amount is to be a predetermined value or less and the electric motor vehicle stops shortly.

* * * * *